United States Patent
Wada et al.

(10) Patent No.: US 6,961,183 B2
(45) Date of Patent: *Nov. 1, 2005

(54) OPTICAL FILTER AND OPTICAL INSTRUMENT

(75) Inventors: Yorio Wada, Hanno (JP); Ken Kawamata, Tokyo (JP); Nobuyoshi Toyohara, Sagamihara (JP)

(73) Assignee: Olympus Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/807,144

(22) Filed: Mar. 24, 2004

(65) Prior Publication Data

US 2005/0012999 A1   Jan. 20, 2005

(30) Foreign Application Priority Data

Mar. 26, 2003 (JP) .............................. 2003-084984
Aug. 22, 2003 (JP) .............................. 2003-299223

(51) Int. Cl.⁷ .............................................. G02B 5/28
(52) U.S. Cl. ...................... 359/584; 359/586; 359/588
(58) Field of Search ............................... 359/586, 588, 359/584

(56) References Cited

U.S. PATENT DOCUMENTS

| | | | |
|---|---|---|---|
| 5,559,825 A * | 9/1996 | Scalora et al. | 372/96 |
| 6,115,180 A | 9/2000 | Hirai et al. | 359/586 |
| 2005/0041293 A1 * | 2/2005 | Wada et al. | 359/586 |

FOREIGN PATENT DOCUMENTS

| | | | |
|---|---|---|---|
| EP | 0 967 496 | 12/1999 | |
| EP | 1258745 A2 * | 11/2002 | ............ G02B 5/28 |
| JP | 61-19962 B2 * | 5/1986 | |
| JP | 2000-009928 | 1/2000 | |
| JP | 3-290629 | 3/2002 | |

OTHER PUBLICATIONS

X. Wang, et al., "Design adn experimental approach of optical reflection filters with graded refractive index profiles", J. Vac. Sci. Technol. A, vol. 17, No. 1, pp. 206-211, Jan. 1999.*

(Continued)

*Primary Examiner*—John Juba, Jr.
(74) *Attorney, Agent, or Firm*—Kenyon & Kenyon

(57) ABSTRACT

An optical filter is provided with a thin film having: a first laminated portion that is constructed by alternately laminating low refractive index layers that have a relatively low refractive index with high refractive index layers that have a relatively high refractive index, and in which the refractive index of the high refractive index layers gradually increases from the substrate side; a second laminated portion in which the refractive indices of the high refractive index layers are equal to or higher than the highest refractive index from among the high refractive index layers constituting the first laminated portion; and a third laminated portion in which the refractive indices of the high refractive index layers gradually decrease from the second laminated portion side. In this thin film, there is inserted a high refractive index variation layer portion, in which the refractive index of a high refractive index layer is set so as to be lower than the other two refractive index layers that are adjacent on both sides thereof via low refractive index layers.

12 Claims, 16 Drawing Sheets

OTHER PUBLICATIONS

B.G. Bovard, "Rugate Filter Design: the modified Fourier Transform technique", Applied Optics, vol. 29, No. 1, pp. 24-30, Jan. 1, 1990.*

Qi Tang, et al., "Fabrication and characteristics of rugate filters deposited by the TSH reactive sputtering method", J. Vac. Sci. Technol. A, vol. 16, No. 6, pp. 3384-ov./Dec./ 1998.*

Handbook of Optics, Second Edition, vol. 1, Fundamentals, Techniques, and Design, (Optical Society of America), McGraw-Hill Inc., pp. 42.29-42.60, 1995.*

William H. Southwell: *Using Apodization Function to Reduce Sidelobes in Regate Filters*, Appl. Opt., vol. 28 (1989) pp. 5091-5094.

P.G. Very, J.A. Dobrowolski, W.J. Wild and R. L. Burton: *Synthesis of High Rejection Filters with the Fourier Transform Method*, Appl. Opt., vol. 28 (1989) pp. 2864-2875.

Handbook Of Optics, Second Edition, vol. 1, Fundamentals, Techniques, and Design, Optical Society of America, McGraw-Hill, 1995 42.50-42.51.

* cited by examiner

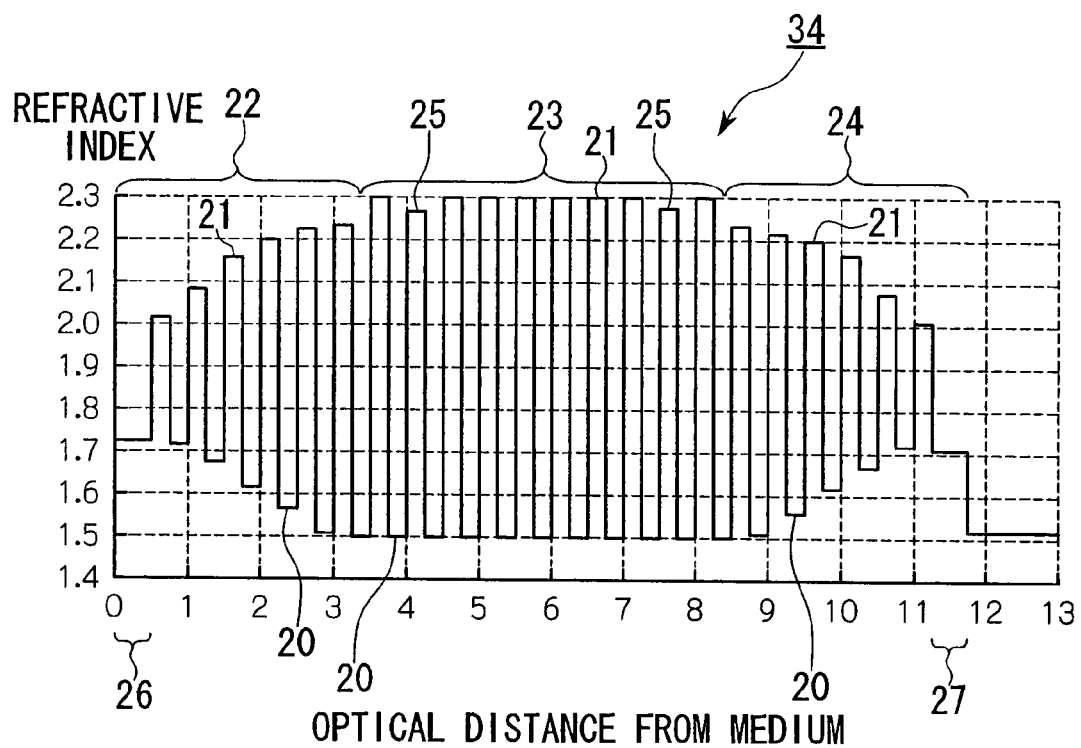
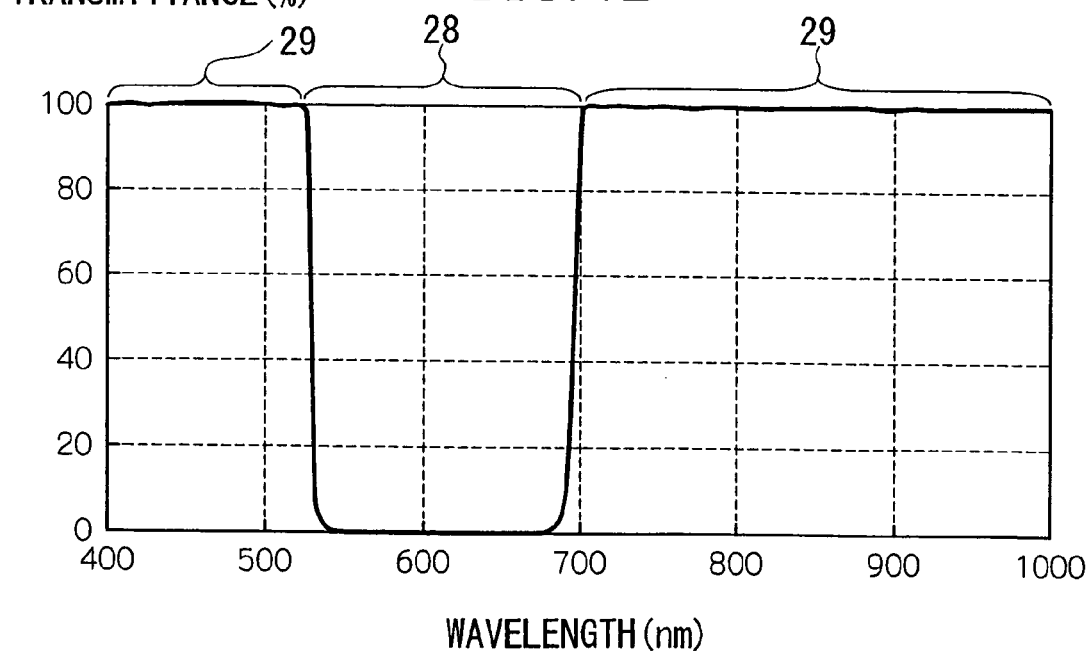

US 6,961,183 B2

OPTICAL FILTER AND OPTICAL INSTRUMENT

BACKGROUND OF THE INVENTION

1. Field of the Invention

The present invention relates to an optical filter and an optical instrument. Priority is claimed on Japanese Patent Application No. 2003-084984, filed Mar. 26, 2003, and Japanese Patent Application No. 2003-299223, filed Aug. 22, 2003 the contents of which are incorporated herein by reference.

2. Description of Related Art

A fluorescence microscope, which is an optical instrument used for observing biological specimens, analyzes the structure and nature of a specimen, such as a cell that has been treated with dye, by observing fluorescent light emitted by the specimen when excitation light is irradiated thereon.

In order to perform the latest genomic analysis, there is a need to observe, for example, both fluorescent light having a peak at 526 nm and excitation light having a wavelength of 502 nm. In this case, because the wavelength of the excitation light is close to the wavelength of the fluorescent light, in order for the fluorescent light to be more efficiently detected, an optical filter that cuts out the excitation light using a stopband and that allows light of the fluorescent light observation wavelength to pass through using a transmission band is used as an extremely important key part in order to determine the sensitivity and accuracy of the fluorescent light measurement.

In this optical filter, properties that permit a sharp rise in the spectral characteristics at boundaries between transmission bands and stopbands, and that also allow substantially 100% of light to be transmitted in the transmission band are required. Furthermore, in the transmission band, it is desirable that there are no cyclic variations (i.e., ripples) in the transmittance in response to increases or decreases in the wavelength.

A minus filter, which is an optical filter that cuts out light in a predetermined wavelength band and allows light of other wavelengths to pass through in this manner, is manufactured, as is shown in FIG. 10A, using a multi-layer film in which layers having a high refractive index and layers having a low refractive index are laminated alternately on a substrate. In FIG. 10A, the horizontal axis shows the optical thickness while the vertical axis shows the film refractive index. In addition, FIG. 10B is a graph in which the relationship between the transmittance and the wavelength of light that passes through a film during construction of the film is shown as a spectral characteristic.

The optical filter is able to make the rise at boundaries between transmission bands and stopbands sharper as the number of the aforementioned layers is increased. Moreover, as is shown in FIG. 11A, it is also possible to design a film in which ripples are reduced by changing the optical thickness of each layer. FIG. 11B shows a case in which the ripples have been reduced.

As is shown in FIG. 12A, if the refractive index of the film is changed cyclically and continuously in the film thickness direction such that the refractive index distribution thereof is formed into what is known as a "wavelet" configuration, then, as is shown in FIG. 12B, it is possible to fundamentally cancel ripples in the transmission band (see, for example, Non-Patent Document 1—"Using Apodization Functions to Reduce Sidelobes in Rugate Filters", W. H. Southwell, Applied Optics, Vol. 28 (1989) Pp. 5091–5094).

For example, various types of structures have been proposed such as those in which a continuous refractive index distribution is divided into steps and approximated, as is shown in FIG. 13A, and structures in which a repeating layer is provided in which the respective refractive indices of a high refractive index layer and a low refractive index layer in an intermediate portion of a cycle are uniform (see, for example, FIG. 1 in Japanese Patent No. 3290629, and Non-Patent Document 2—"Synthesis of High Rejection Filters with the Fourier Transform Method", P. G. Very, J. A. Dobrowlski, W. J. Wild, and R. L. Burton, Applied Optics, Vol. 28 (1989) Pp. 2864–2875, and Non-Patent Document 3—"Handbook of Optics, Second Edition, Vol. 1, Fundamentals, Techniques, and Design", Optical Society of America, published by McGraw-Hill, 1995, Pp 42, 50).

SUMMARY OF THE INVENTION

An optical filter of the present invention includes a substrate and a thin film that is formed on the substrate, wherein the thin film includes low refractive index layers and high refractive index layers that have a higher refractive index than the low refractive index layers, the low refractive index layers and the high refractive index layers being alternately laminated from the substrate side, and wherein in this thin film are further formed: a first laminated portion in which the refractive indices of the high refractive index layers gradually increase from the substrate side; a second laminated portion that is adjacent to the first laminated portion, and in which the refractive indices of the high refractive index layers are substantially the same as the highest refractive index from among the high refractive index layers constituting the first laminated portion; and a third laminated portion that is adjacent to the second laminated portion, and in which the refractive indices of the high refractive index layers gradually decrease from the second laminated portion side, and wherein a high refractive index variation layer portion, in which the refractive index of the high refractive index layer is set so as to be lower than the other two high refractive index layers that are adjacent on both sides thereof via the low refractive index layers, is inserted into at least one of the first laminated portion through the third laminated portion.

The high refractive index variation layer portion may be inserted at a boundary or in a vicinity of a boundary between the second laminated portion and the first laminated portion or between the second laminated portion and the third laminated portion.

A refractive index of the low refractive index layers may be substantially the same as a refractive index of the substrate.

If a design wavelength for a central wavelength ($\lambda$) of a wavelength band in which transmission is blocked is taken as $\lambda/n$ (wherein n is an integer), then optical thicknesses of the high refractive index layers, the low refractive index layers, and the high refractive index variation layer portion may be set to substantially n/4 of the design wavelength.

An optical thickness of at least one of a layer forming an initial region that is adjacent to the substrate and an ultimate region that is on an opposite side from the substrate from the thin film may be set to substantially n/2 of the design wavelength.

An optical filter of the present invention includes a substrate and a thin film that is formed on the substrate, wherein the thin film includes low refractive index layers and high refractive index layers that have a higher refractive index than the low refractive index layers, the low refractive index layers and the high refractive index layers being alternately laminated from the substrate side, and wherein in this thin film are further formed: a first laminated portion in which the refractive indices of the high refractive index layers gradually increase from the substrate side; a second laminated portion that is adjacent to the first laminated portion, and in which the refractive indices of the high refractive index layers are substantially the same as the highest refractive index from among the high refractive index layers constituting the first laminated portion; and a third laminated portion that is adjacent to the second laminated portion, and in which the refractive indices of the high refractive index layers gradually decrease from the second laminated portion side, and wherein a low refractive index variation layer portion, in which the refractive index of the low refractive index layer is set so as to be higher than the other two low refractive index layers that are adjacent on both sides thereof via the high refractive index layers, is inserted into at least one of the first laminated portion through the third laminated portion.

A refractive index of the high refractive index layers may be substantially the same as a refractive index of the substrate.

An optical filter of the present invention includes a substrate and a thin film that is formed on the substrate, wherein the thin film includes low refractive index layers and high refractive index layers that have a higher refractive index than the low refractive index layers, the low refractive index layers and the high refractive index layers being alternately laminated from the substrate side, and wherein in this thin film are further formed: a first laminated portion in which the refractive indices of the high refractive index layers gradually increase from the substrate side, and the refractive indices of the low refractive index layers gradually decrease from the substrate side; a second laminated portion that is adjacent to the first laminated portion, and in which the refractive indices of the high refractive index layers are substantially the same as the highest refractive index from among the high refractive index layers constituting the first laminated portion, and the refractive indices of the low refractive index layers are substantially the same as the lowest refractive index from among the low refractive index layers constituting the first laminated portion; and a third laminated portion that is adjacent to the second laminated portion, and in which the refractive indices of the high refractive index layers gradually decrease from the second laminated portion side, and the refractive indices of the low refractive index layers gradually increase from the second laminated portion side, and wherein at least one of a high refractive index variation layer portion, in which the refractive index of the high refractive index layer is set so as to be lower than the other two high refractive index layers that are adjacent on both sides thereof via the low refractive index layers and the low refractive index variation layer portion, in which the refractive index of a low refractive index layer is set so as to be higher than the other two low refractive index layers that are adjacent on both sides thereof via the high refractive index layers, is inserted into at least one of the first laminated portion through the third laminated portion.

At least one of the high refractive index variation layer portion and the low refractive index variation layer portion may be inserted at a boundary or in a vicinity of a boundary between the second laminated portion and the first laminated portion or between the second laminated portion and the third laminated portion.

If a design wavelength for a central wavelength ($\lambda$) of a wavelength band in which transmission is blocked is taken as $\lambda/n$ (wherein n is an integer), then optical thicknesses of the high refractive index layers, the low refractive index layers, the high refractive index variation layer portion, and the low refractive index variation layer portion may be set to substantially n/4 of the design wavelength.

An optical thickness of at least one of a layer forming an initial region that is adjacent to the substrate and an ultimate region that is on an opposite side from the substrate from the thin film may be set to substantially n/2 of the design wavelength.

An optical instrument of the present invention includes the above described optical filter.

BRIEF DESCRIPTION OF THE DRAWINGS

FIGS. 7A and 7B are views showing another example of the aforementioned first embodiment and are graphs showing a film structure and spectral characteristics of an absorption filter.

DETAILED DESCRIPTION OF THE INVENTION

Next, the first embodiment of the present invention will be described with reference made to FIGS. 1 to 3.

Figure 1:
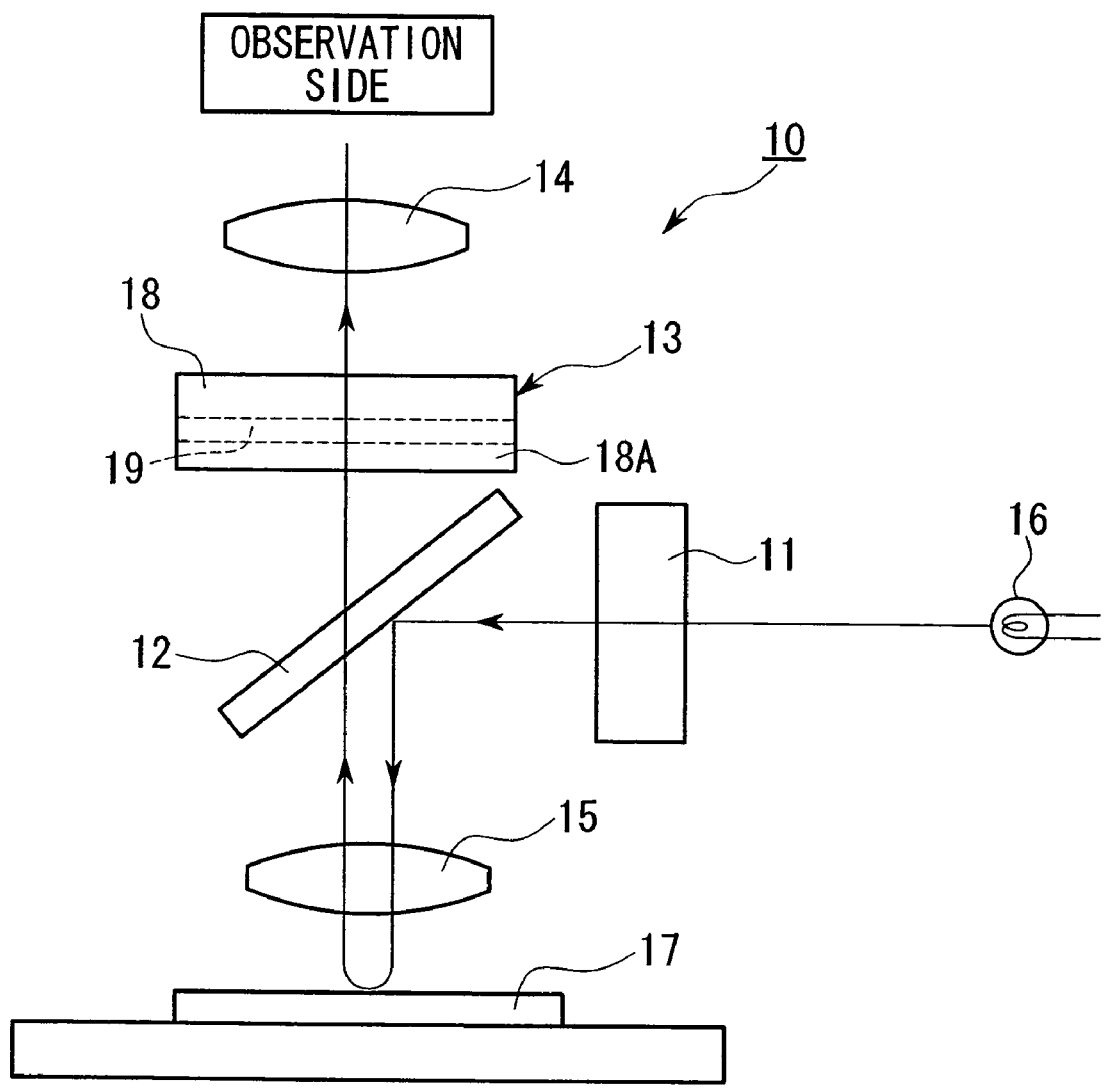
FIG. 1 is a view showing an outline of a fluorescence microscope that is a first embodiment of an optical instrument in which an optical filter of the present invention is provided.

As is shown in FIG. 1, a fluorescence microscope (i.e., an optical instrument) 10 of the present embodiment includes an excitation filter 11, a dichroic mirror 12, an absorption filter (i.e., an optical filter) 13, an ocular lens 14, and an objective lens 15.

The excitation filter 11 is placed on an optical path of the light source 16 such that it selectively allows only specific wavelengths out of the light that is generated from the light source 16 to pass through in the form of excitation light.

The dichroic mirror 12 is a semitransparent mirror and is set so as to alter the optical path of the light that has passed through the excitation filter 11 such that this light is irradiated onto a mounted specimen 17 such as, for example, a biological cell. In addition, the dichroic mirror 12 is set so as to allow fluorescent light generated from the specimen 17 by this irradiation to pass through to the observing side. The ocular leans 14 and the objective lens 15 are positioned such that the fluorescent light can be observed.

The absorption filter 13 is formed by a glass substrate 18, a thin film 19 that is formed on the substrate 18, and an incident side medium 18A placed on the thin film 19. The absorption filter 13 selectively allows only fluorescent light to pass through. The incident side medium 18A is formed by a member (for example, a glass plate) having the same refractive index as the substrate 18.

Figure 2A:
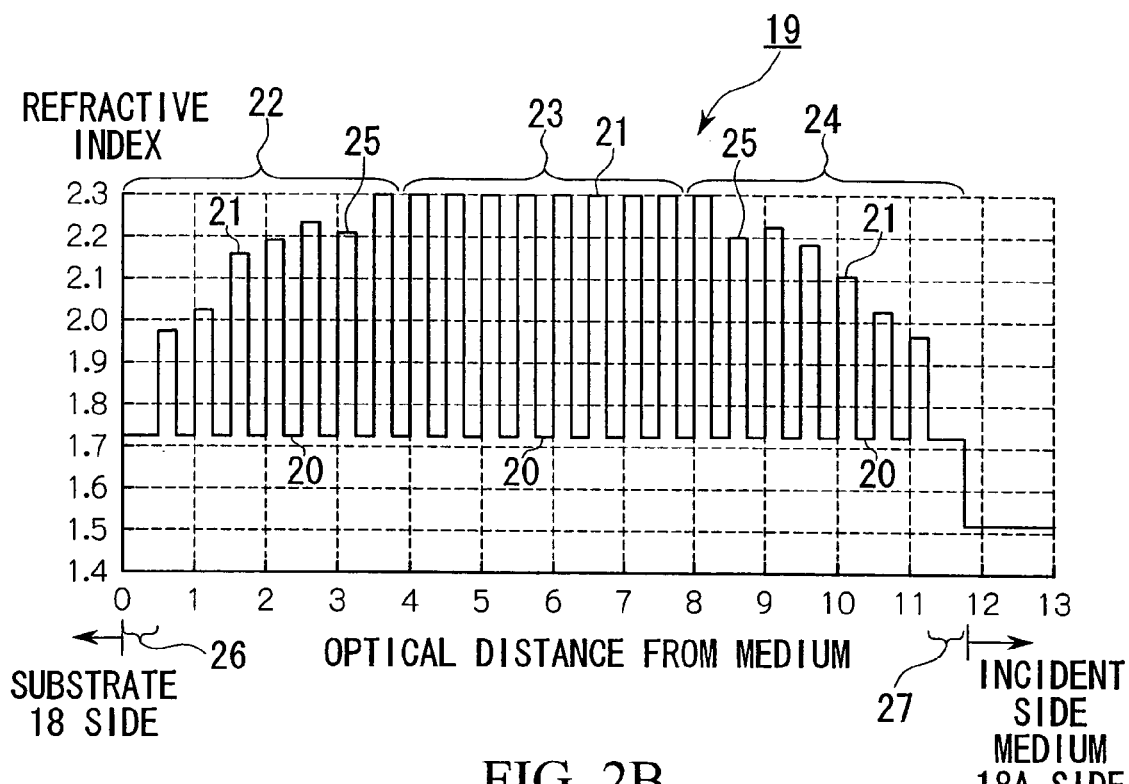
FIGS. 2A and 2B are graphs showing a film structure and spectral characteristics of an absorption filter that is an optical filter provided in the aforementioned fluorescence microscope.
Figure 3:
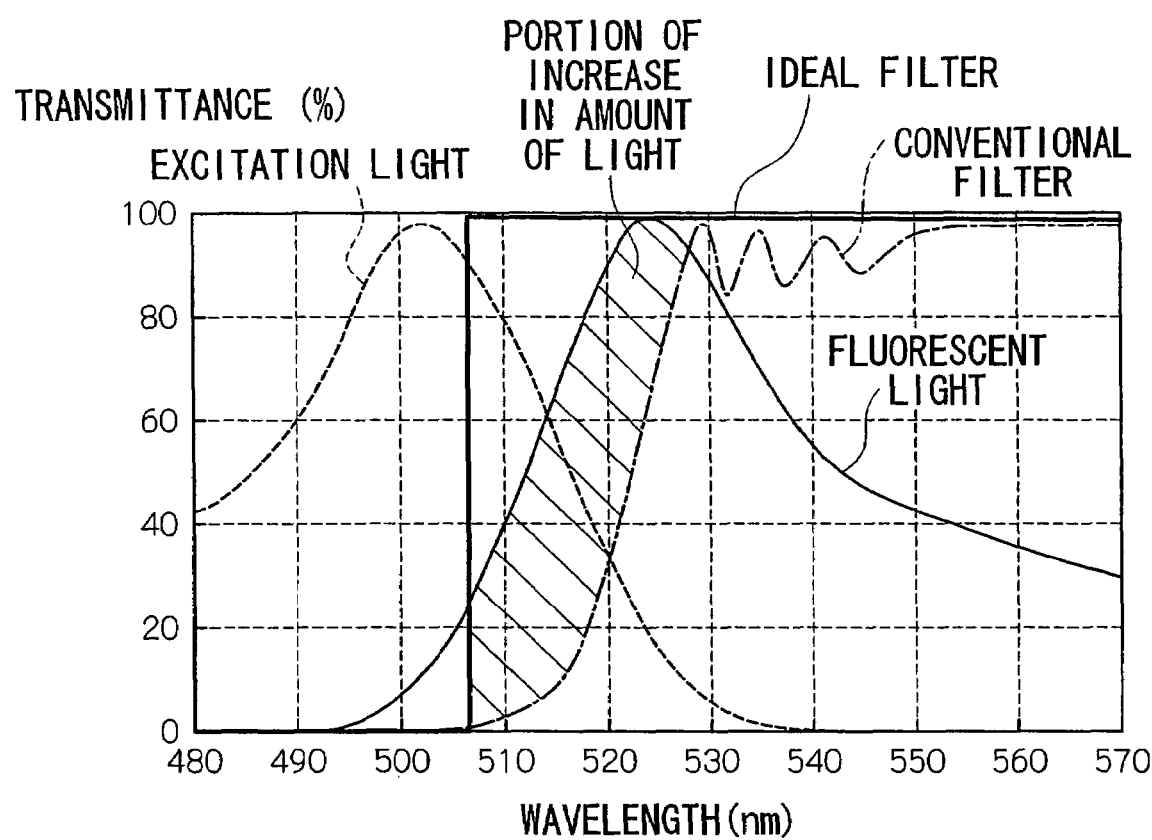
FIG. 3 is a graph showing a relationship between wavelength and transmittance in the aforementioned fluorescence microscope.

As is shown in FIG. 2A, the thin film 19 is formed by: a first laminated portion 22 that is constructed by alternately laminating from the substrate 18 side low refractive index layers 20 that have a relatively low refractive index with high refractive index layers 21 that have a relatively high refractive index, and in which the refractive index of the high refractive index layers 21 gradually increases from the substrate 18 side; a second laminated portion 23 that is adjacent to the first laminated portion 22, and in which the refractive index of the high refractive index layers 21 is substantially the same as the highest refractive index from among the high refractive index layers 21 forming the first laminated portion 22; and a third laminated portion 24 that is adjacent to the second laminated portion 23, and in which the refractive index of the high refractive index layers 21 gradually decreases from the second laminated portion 23 side.

Note that the term "substantially the same" may refer to a range in which the refractive indices are completely the same or to a range in which unevenness in the refractive indices is 0.2 or less.

The low refractive index layers 20 are mainly formed from silicon oxide while the high refractive index layers 21 are mainly formed from niobium oxide.

In the present embodiment, the refractive indices of the substrate 18 and the incident side medium 18A are set at 1.52, the refractive index of the high refractive index layers 21 changes from 1.98 to 2.3, and the refractive index of the low refractive index layers 20 is set as a fixed value of 1.72.

In the thin film 19, a high refractive index variation layer portion 25, in which the refractive index of a high refractive index layer 21 is set so as to be lower than the other two high refractive index layers 21 that are adjacent on both sides thereof via low refractive index layers 20, is inserted both inside the first laminated section 22 and at the boundary between this first laminated section 22 and the second laminated section 23, and also inside the third laminated section 24 and at the boundary between this third laminated section 24 and the second laminated section 23.

In the present embodiment, the refractive index of the high refractive index layers 21 in the second laminated portion 23 is 2.3, which is the same as the highest refractive index from among the refractive indices of the high refractive index layers 21 of the first laminated portion 22. And the reference index of the high refractive index variation layer portion 25 is set to 2.2.

In the thin film 19, if a design wavelength for the central wavelength ($\lambda$) of the wavelength band in which transmission is blocked is taken as $\lambda/n$ (wherein n is an integer), then with n=1, for example, the optical thickness of the high refractive index layers 21 and the low refractive index layers 20 is set at one quarter of the design wavelength, and the optical thicknesses of each of the layer forming the first region 26 that is adjacent to the substrate 18 and the layer forming the ultimate region 27 that is adjacent to the incident side medium 18A, which is on the opposite side from the substrate 18, are set to one half of the design wavelength.

In the present embodiment, because $\lambda$ is set to 600 nm, the optical thicknesses are respectively 150 nm and 300 nm.

Figure 2B:
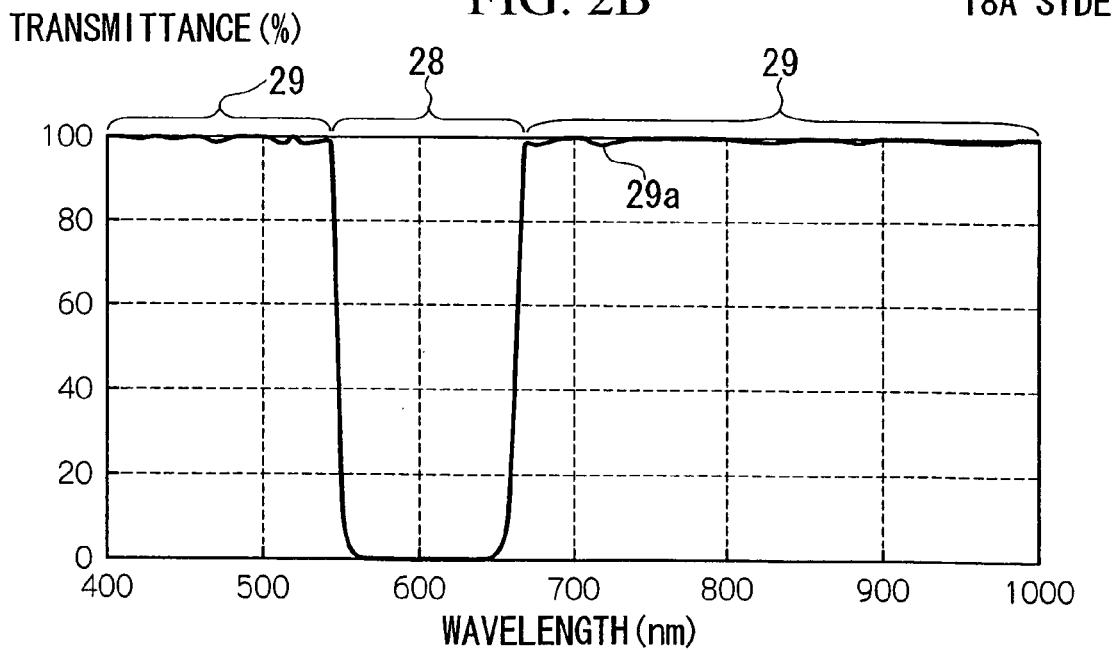

Note that FIG. 2B shows the results of the simulation in which the total number of laminated layers was 45 and in which there was no refractive index dispersion in each layer from the initial region 26 of the thin film 19 to the ultimate region 27 thereof.

Next, a method of observing using the fluorescence microscope 10 of the present embodiment will be described.

As is shown in FIG. 1, light that has been emitted from the light source 16 passes through the excitation filter 11 so as to become excitation light of a specific wavelength. It is then projected onto the dichroic mirror 12. This optical path of this excitation light is bent by the dichroic mirror 12 and is converged by the objective lens 15 so as to be irradiated on the specimen 17. As a result of this irradiation, fluorescent light is generated from the specimen 17. This fluorescent light becomes parallel light via the objective lens 15 and arrives at the dichroic mirror 12. It then passes through the dichroic mirror 12 and reaches the absorption filter 13.

Fluorescent light that reaches the absorption filter 13 is irradiated from the incident side medium 18A and passes through the third laminated portion 24, the second laminated portion 23, and the first laminated portion 22 that are shown in FIG. 2A. This fluorescent light is then once again emitted to the outside from the substrate 18 side shown in FIG. 1.

Excitation light and the like having wavelengths other than that of fluorescent light is also mixed together therewith and irradiated into the absorption filter 13. However, because the thin film 19 has the above described first laminated portion 22 through the third laminated portion 24, the absorption filter 13 prevents light in a stopband 28, which is a wavelength band to which the excitation light and the like belongs, from being irradiated to the outside and, at the same time, allows light in a transmission band 29, which is a wavelength band to which the fluorescent light belongs to pass through.

At this time, because the high refractive index variation layer portion 25 has been inserted and because the optical thicknesses of the high refractive index layers 21 and the low refractive index layers 20 have been set to one quarter of the design wavelength, the transmitted light has consistent optical characteristics due to the excellence of the ability to control film thickness during film formation.

Furthermore, because the optical thicknesses of both the layer constituting the initial region 26 and the layer constituting the ultimate region 27, which is on the opposite from the initial region 26, are set to one half of the design wavelength, ripples in the transmittance are restricted for the wavelength in which the detection of fluorescent light is desired.

Fluorescent light emitted from the absorption filter 13 passes through the ocular lens 14 and is converged, and then arrives at the observation side.

As is shown in FIG. 2B, for example, according to the absorption filter 13, it is possible to form a sharp rise in spectral characteristics in boundaries between the stopband 28 and the transmission bands 29, and ripples 29a in the transmission bands 29 can be almost completely suppressed. Moreover, because the film structure makes control during film formation a simple matter, the consistency of the spectral characteristics can be improved. Furthermore, according to this fluorescence microscope 10, because the absorption filter 13 has spectral characteristics that are close to those of the ideal filter shown in FIG. 3, it is able to transmit light without reducing the amount of light (i.e., the increase portion in the amount of light) in those wavelength regions in which the amount of transmitted light is decreased in a conventional filter. As a result, it is possible to considerably improve the detection sensitivity when measuring fluorescent light, and also to improve the analysis accuracy and detection accuracy in genome analysis and the like, and to also shorten the observation time.

Next, a description will be given of the second embodiment of the present invention with reference made to FIG. 4A. Note that, in the description given below, component elements that are the same as those appearing in the first embodiment are given the same descriptive symbols and a description thereof is omitted.

The present embodiment differs from the first embodiment in that, in the thin film 30 of the present embodiment, the refractive indices of the low refractive index layers 20 constituting the first laminated portion 22 and the third laminated portion 24 are also changed, and in that, instead of the high refractive index variation layer portion 25, a low refractive index variation layer portion 31 is inserted.

Namely, in the thin film 30, the refractive indices of the low refractive index layers 20 constituting the first laminated portion 22 change so as to become gradually lower from the substrate 18 side, the refractive indices of the low refractive index layers 20 constituting the second laminated layer portion 23 are substantially the same as the lowest refractive index from among those of the low refractive index layers 20 constituting the first laminated portion 22, and the refractive indices of the low refractive index layers 20 constituting the third laminated portion 24 change so as to become gradually higher from the second laminated portion 23 side.

In addition, a low refractive index variation layer portion 31, in which the refractive index of a low refractive index layer 20 is set so as to be higher than the two low refractive index layers 20 that are adjacent on both sides thereof via high refractive index layers 21, is inserted at both the boundary between the first laminated section 22 and the second laminated section 23, and also at the boundary between the third laminated section 24 and the second laminated section 23.

Figure 4A:
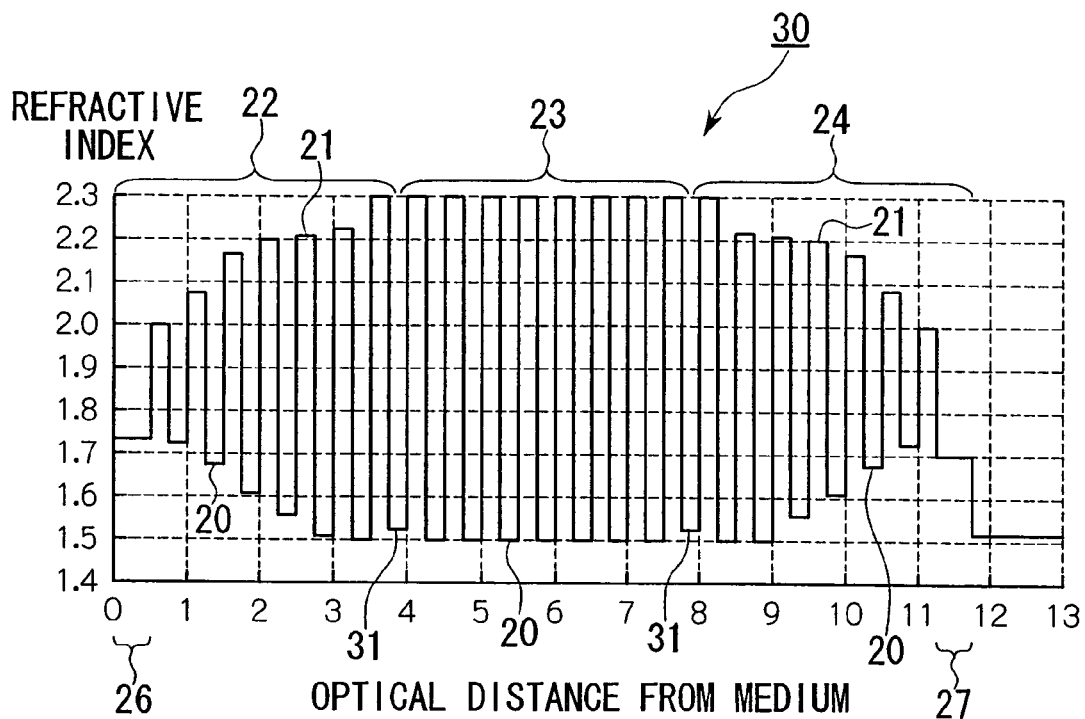
FIGS. 4A and 4B are graphs showing a film structure and spectral characteristics of an absorption filter that is a second embodiment of an optical filter of the present invention.

Note that, in the present embodiment, as is shown in FIG. 4A, the refractive indices of the low refractive index layers 20 in the first laminated portion 22 is changed from 1.5 to 1.72, while the refractive indices of the low refractive index layers 20 in the second laminated portion 23 are set at 1.5, which is the same as the lowest refractive index from among those of the low refractive layers 20 in the first refractive index portion 22, and the refractive indices of the low refractive index variation layer portion 31 are set to 1.53.

Figure 4B:
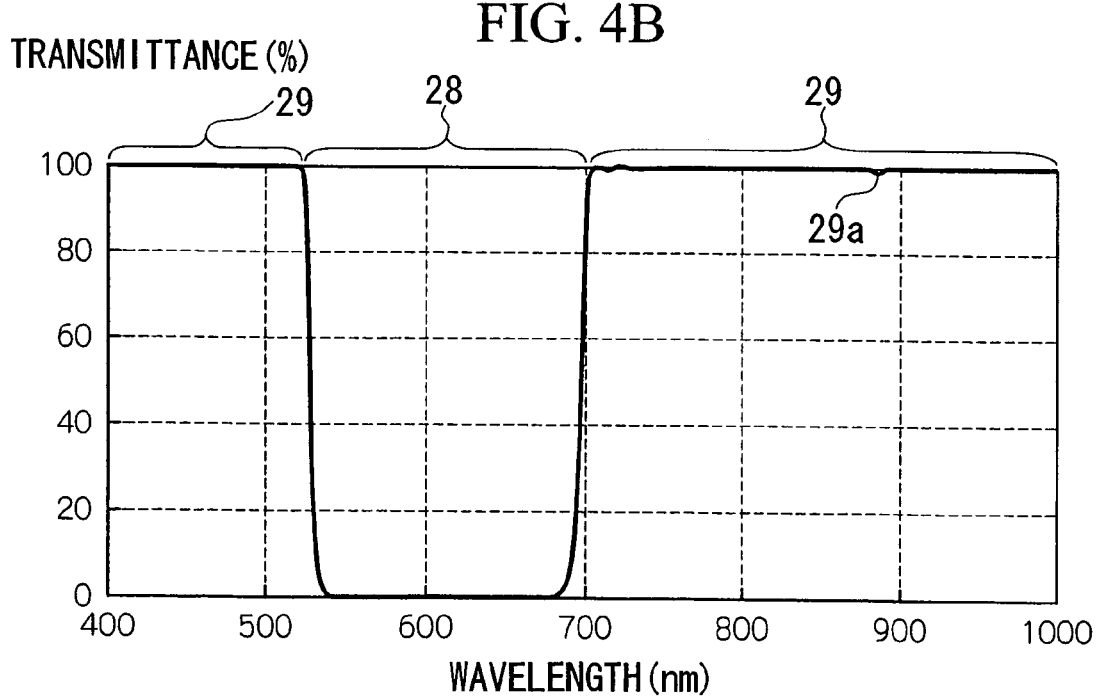

In addition to the above described structure, FIG. 4B shows the results of the simulation in which the total number of laminated layers was 45 and in which there was no refractive index dispersion in each layer from the initial region 26 to the ultimate region 27.

According to the absorption filter and fluorescence microscope of the present embodiment, as is shown, for example, in FIG. 4B, it is possible to reduce ripples 29a in the transmission bands of fluorescent light in the same way as in the first embodiment, and to consistently obtain a sufficient amount of light.

Next, a description will be given of the third embodiment of the present invention with reference made to FIG. 5A. Note that, in the description given below, component elements that are the same as those appearing in the first and second embodiments are given the same descriptive symbols and a description thereof is omitted.

The present embodiment differs from the second embodiment in that, in the thin film 32, a high refractive index variation layer portion 25 is inserted.

Namely, a high refractive index variation layer portion 25, in which the refractive index of a high refractive index layer 21 is set so as to be lower than the two other high refractive index layers 21 that are adjacent on both sides thereof via low refractive index layers 20, is inserted both inside the first laminated portion 22 and at the boundary between the first laminated section 22 and the second laminated section 23, and also inside the third laminated portion 24 and at the boundary between the third laminated section 24 and the second laminated section 23.

In addition, a low refractive index variation layer portion 31, in which the refractive index of a low refractive index layer 20 is set so as to be higher than the two low refractive index layers 20 that are adjacent on both sides thereof via high refractive index layers 21, is inserted both inside the second laminated portion 23 and at the boundary between the second laminated section 23 and the first laminated section 22, and inside the second laminated portion 23 and at the boundary between the second laminated section 23 and the third laminated section 24.

Figure 5A:
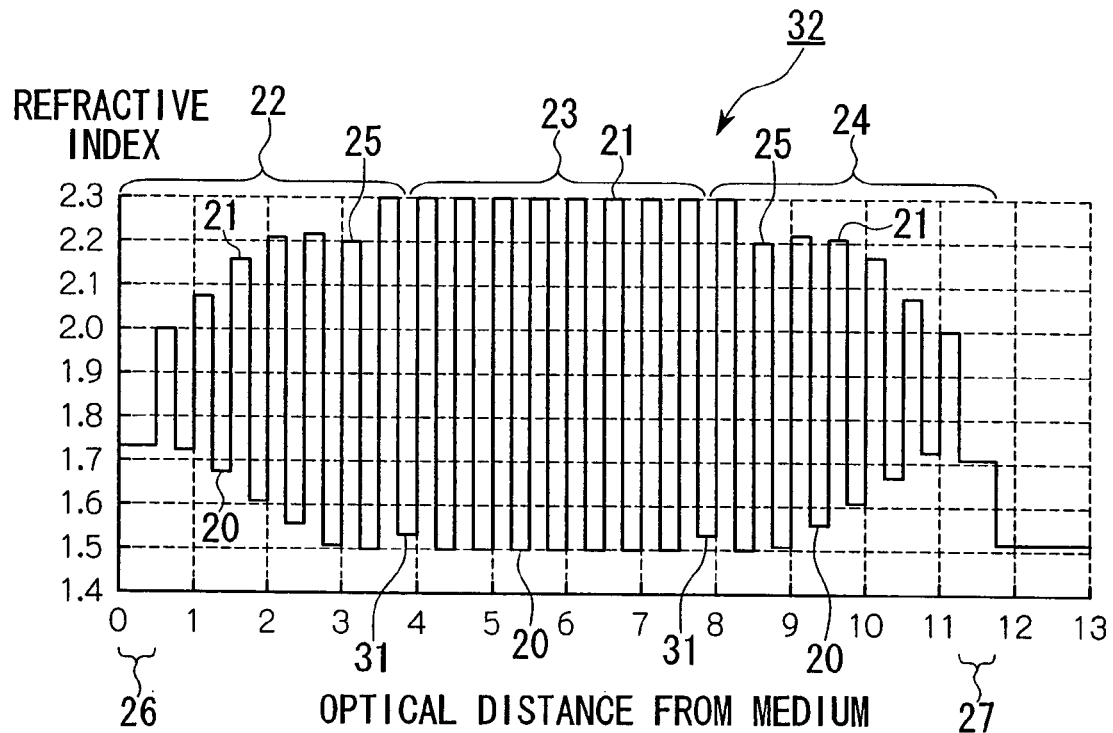
FIGS. 5A and 5B are graphs showing a film structure and spectral characteristics of an absorption filter that is a third embodiment of an optical filter of the present invention.

In addition, in the present embodiment, as is shown in FIG. 5A, the refractive indices of the low refractive index layers 20 and the high refractive index layers 21 are changed in the same manner as in each of the above described embodiments, and the refractive indices of the high refractive index variation layer portion 25 and the low refractive index layer variation portion 31 are set to the same values as in each of the above described embodiments.

Figure 5B:
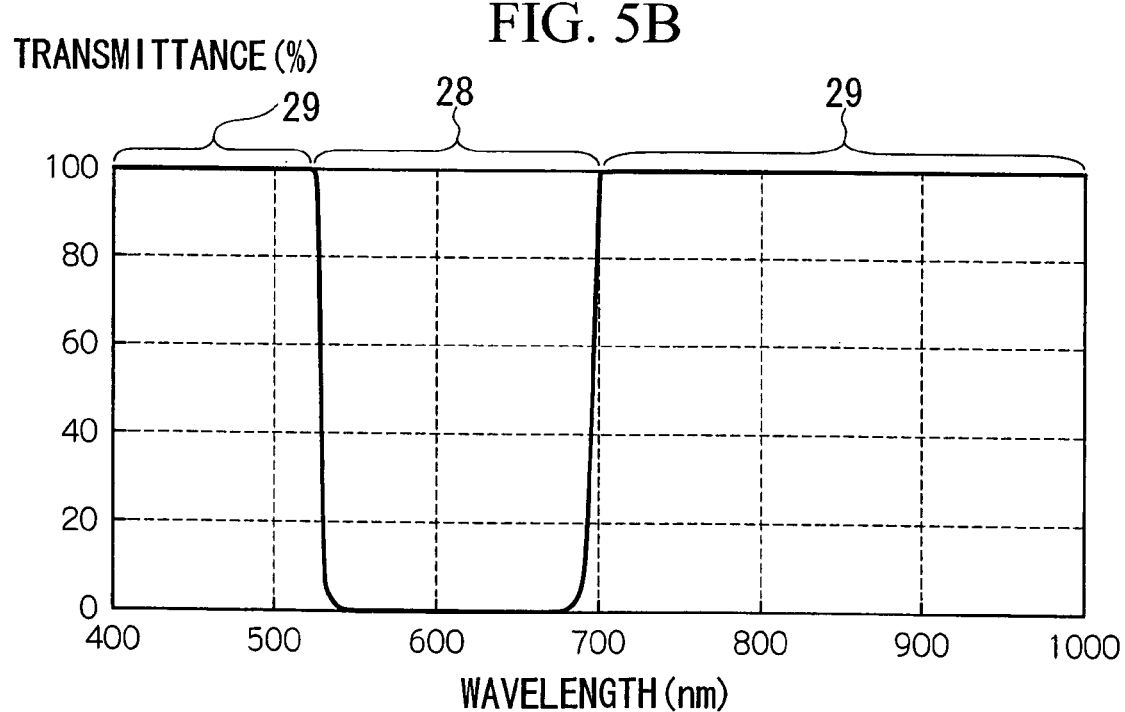

In addition to the above described structure, FIG. 5B shows the results of the simulation in which the total number of laminated layers was 45 and in which there was no refractive index dispersion in each layer from the initial region 26 to the ultimate region 27.

According to the absorption filter and fluorescence microscope of the present embodiment, as is shown, for example, in FIG. 5B, it is possible to reduce ripples in fluorescent light in the transmission bands even more excellently than in each of the above described embodiments, and to consistently obtain a sufficient amount of light.

Note that, in the present embodiment, with n=1, the design wavelength is set to 600 nm, the same as the central wavelength. The optical thicknesses of the high refractive index layers 21 and the low refractive index layers 20 are set to one quarter of the design wavelength. In addition, the optical thicknesses of the respective layers constituting the initial region 26 and the ultimate region 27, which is on the opposite side from the initial region 26, are set to one half of the design wavelength, which is twice the optical thicknesses of the high refractive index layers 21 and the low refractive index layers 20. However, even if the thin film 32 is formed with n=2, with the design wavelength set to 300 nm, and with the optical thicknesses of the high refractive index layers 21 and the low refractive index layers 20 set to one half of the design wavelength, and the optical thicknesses of the respective layers constituting the initial region 26 and the ultimate region 27, which is on the opposite side from the initial region 26, set to the same as the design wavelength, which is twice the optical thicknesses of the high refractive index layers 21 and the low refractive index layers 20, it is possible to obtain an absorption filter having exactly the same spectral characteristics as those shown in FIG. 5B.

Furthermore, even if a thin film is formed using a design wavelength of 600/n (wherein n is an integer) nm for a central wavelength of 600 nm, and with the optical thicknesses of the high refractive index layers 21 and the low refractive index layers 20 set at n/4 of the design wavelength, and with the optical thicknesses of the respective layers constituting the first region 26 and the ultimate region 27, which is on the opposite side from the initial region 26, set to n/2 of the design wavelength, which is twice the optical thicknesses of the high refractive index layers 21 and the low refractive index layers 20, it is possible to obtain an absorption filter having the same spectral characteristics.

Note that the technological range of the present invention is not limited solely to each of the above described embodiments and other modifications can be made without departing from the spirit or scope of the present invention.

Figure 6A:
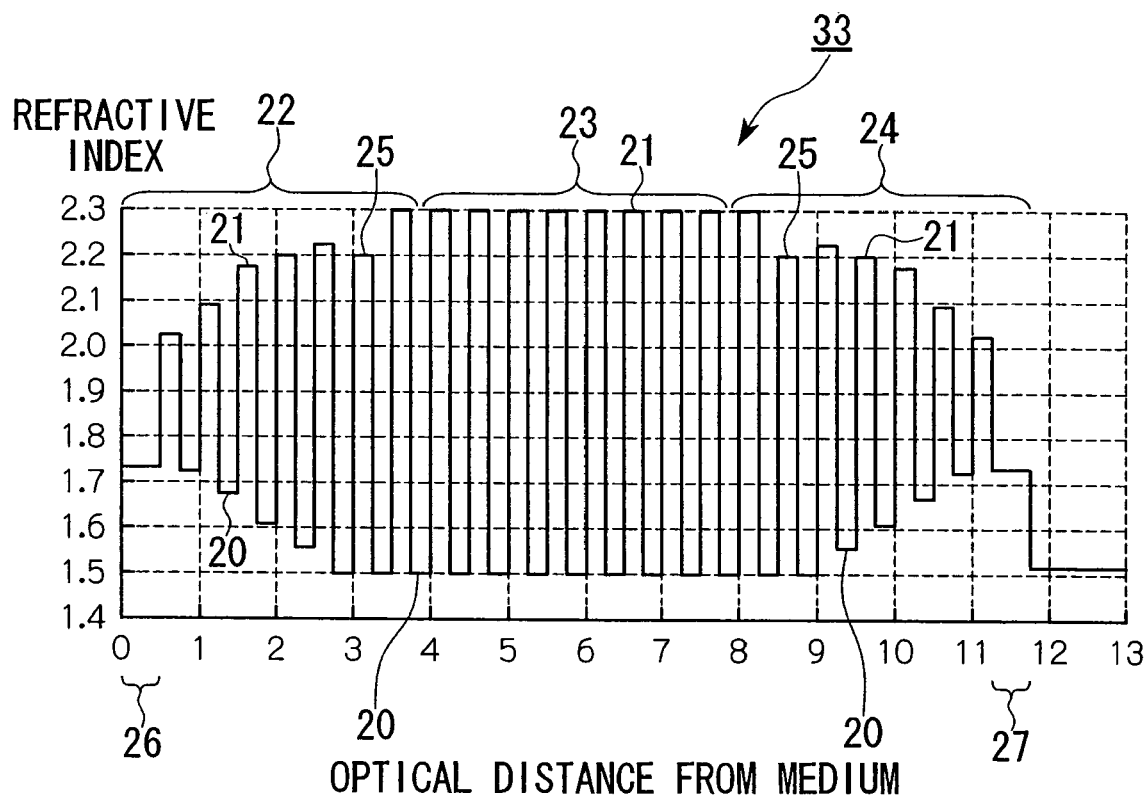
FIGS. 6A and 6B are views showing another example of the aforementioned first embodiment and are graphs showing a film structure and spectral characteristics of an absorption filter.
Figure 6B:
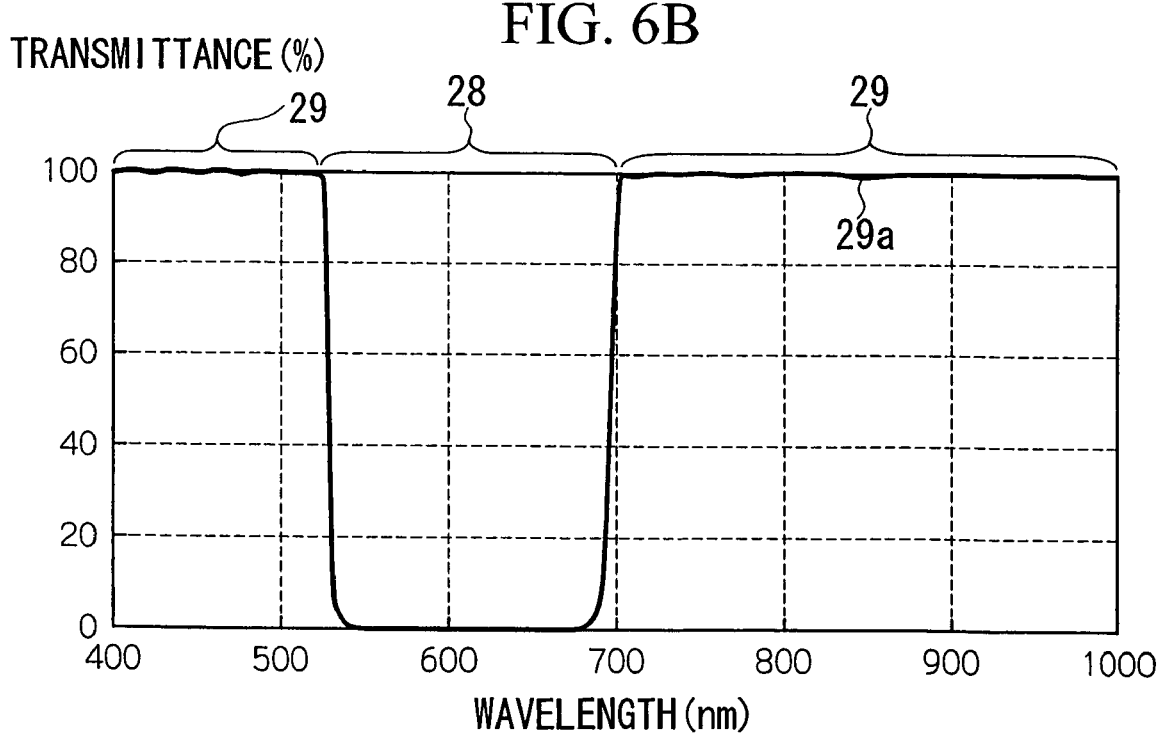

For example, as another example of the first embodiment, as is shown in FIG. 6A, in the thin film structure shown in FIG. 2A, it is also possible, instead of inserting the low refractive index variation layer portion 31, to employ a thin film 33 in which the refractive indices of the low refractive index layers 20 gradually change. Moreover, as is shown in FIG. 7A, it is also possible to use a thin film 34 in which one high refractive index variation layer portion 25 is inserted inside the second laminated portion 23 and in the vicinity of the boundary between the second laminated portion 23 and the first laminated portion 22 and also inside the second laminated portion 23 and in the vicinity of the boundary between the second laminated portion 23 and the third laminated portion 24. In each case, as is shown in the results of simulations performed using the respective thin films, as are shown in FIGS. 6B and 7B, the same operations and effects can be obtained as those for the above described first embodiment.

Figure 8A:
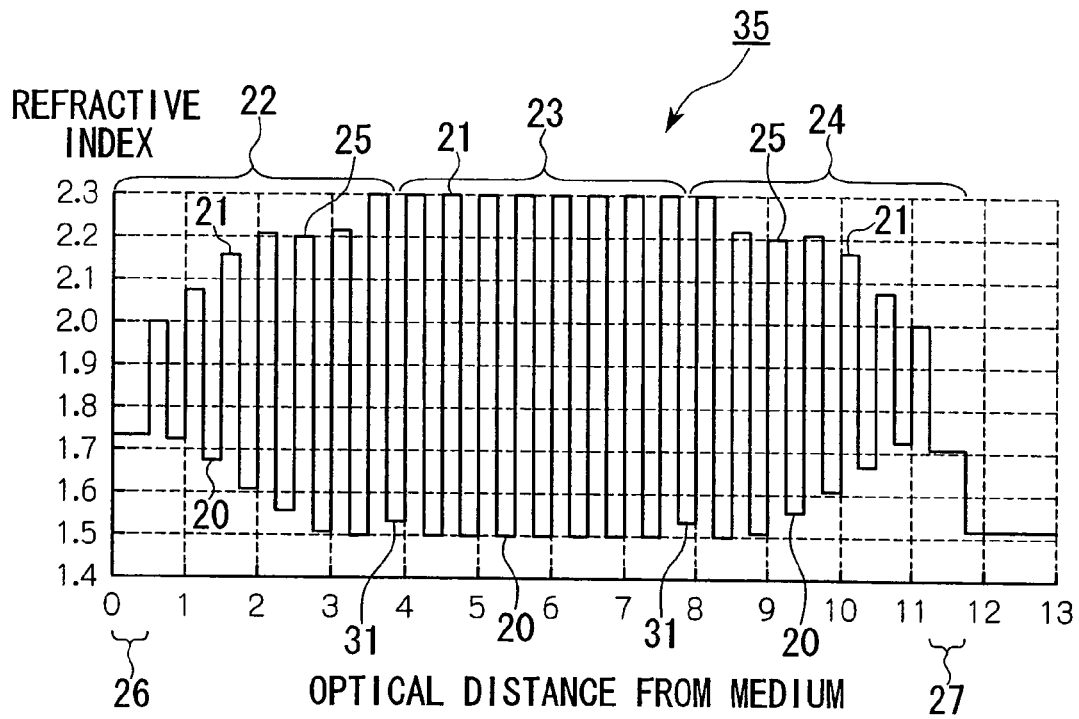
FIGS. 8A and 8B are views showing another example of the aforementioned third embodiment and are graphs showing a film structure and spectral characteristics of an absorption filter.
Figure 8B:
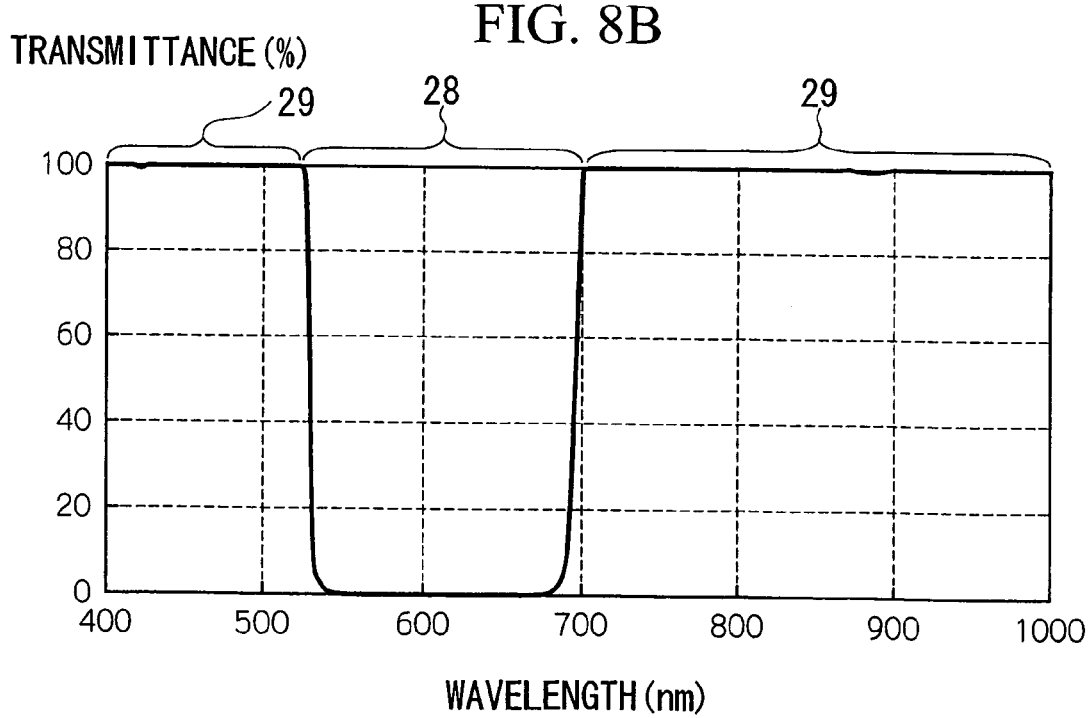

Moreover, as another example of the third embodiment, as is shown in FIG. 8A, it is also possible to use a thin film 35 in which one high refractive index variation layer portion 25 is inserted inside both the first laminated portion 22 and the third laminated portion 24. The results of the simulation are shown in the same manner in FIG. 8B. According to this thin film 35, ripples can be suppressed to a greater extent than in the above first embodiment.

Figure 9A:
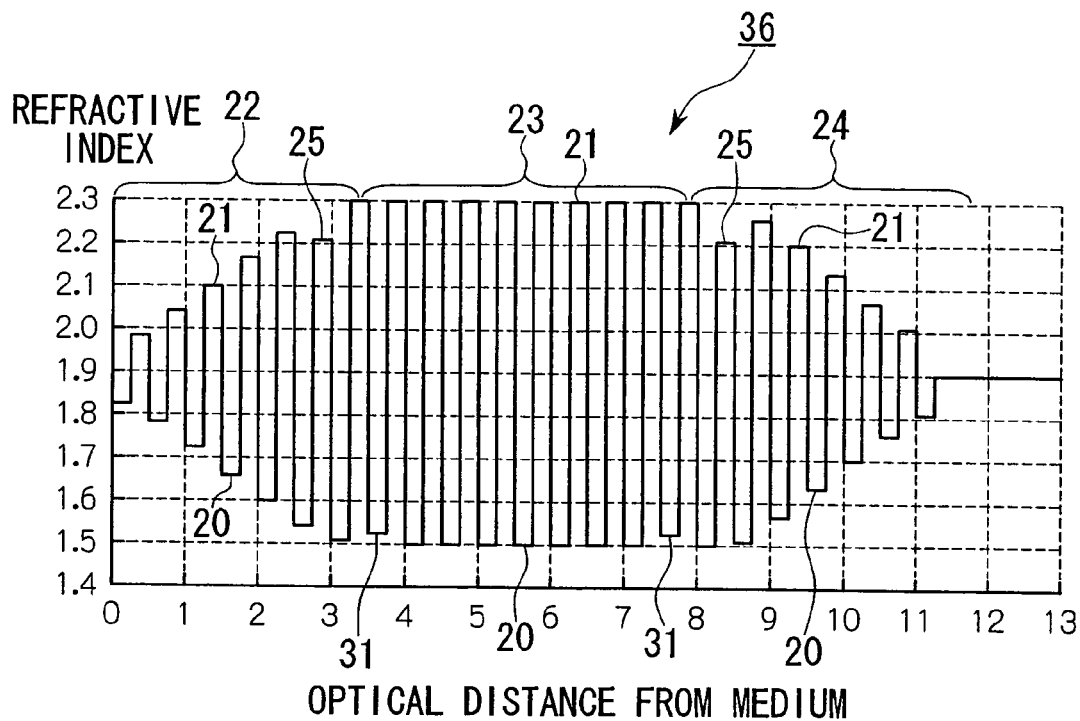
FIGS. 9A and 9B are views showing another example of the aforementioned third embodiment and are graphs showing a film structure and spectral characteristics of an absorption filter.

Moreover, as is shown in FIG. 9A, it is also possible to use a thin film 36 in which the optical thicknesses of all the high refractive index layers 21 and low refractive index layers 20 are set to one quarter of the design wavelength. The results of the simulation are shown in the same manner in FIG. 9B. According to this thin film 36 as well, the ripples 29a can be reduced.

Figure 9B:
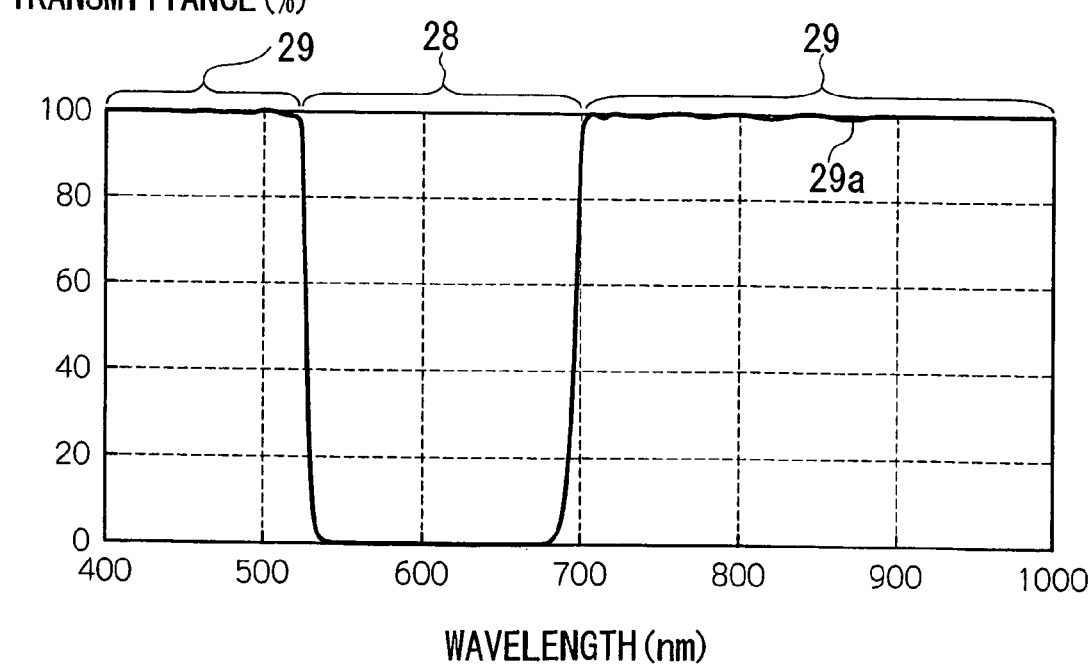
Figure 10A:
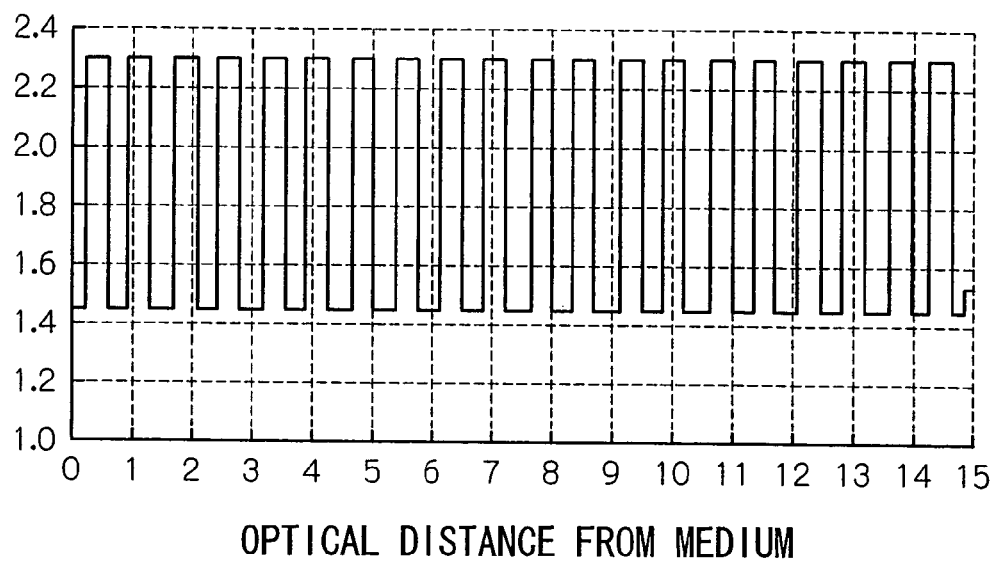
FIGS. 10A and 10B are graphs showing a film structure and spectral characteristics of a conventional absorption filter.
Figure 10B:
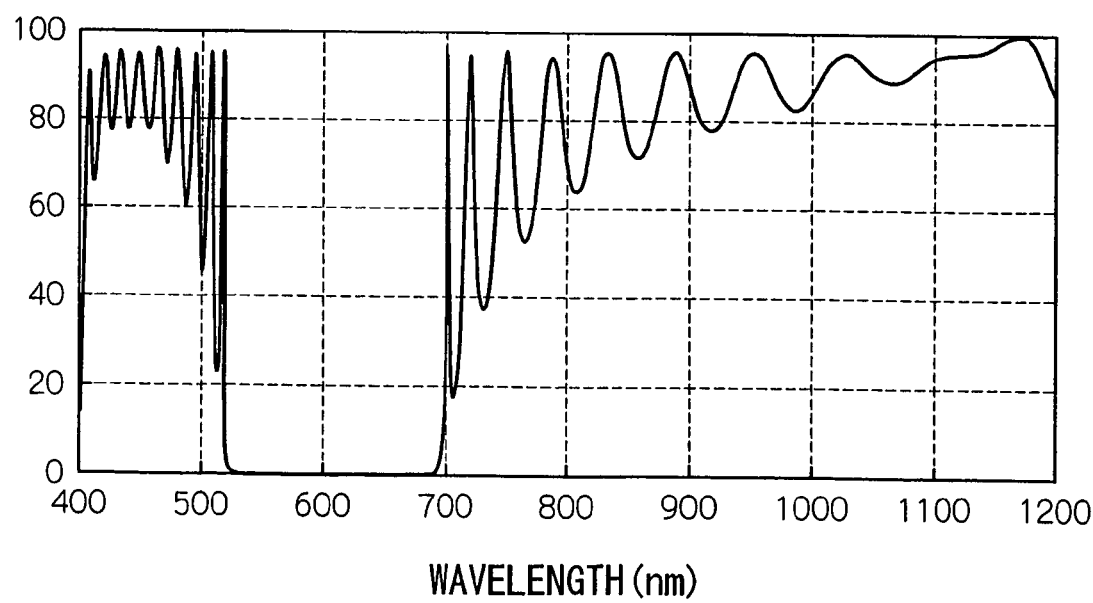
Figure 11A:
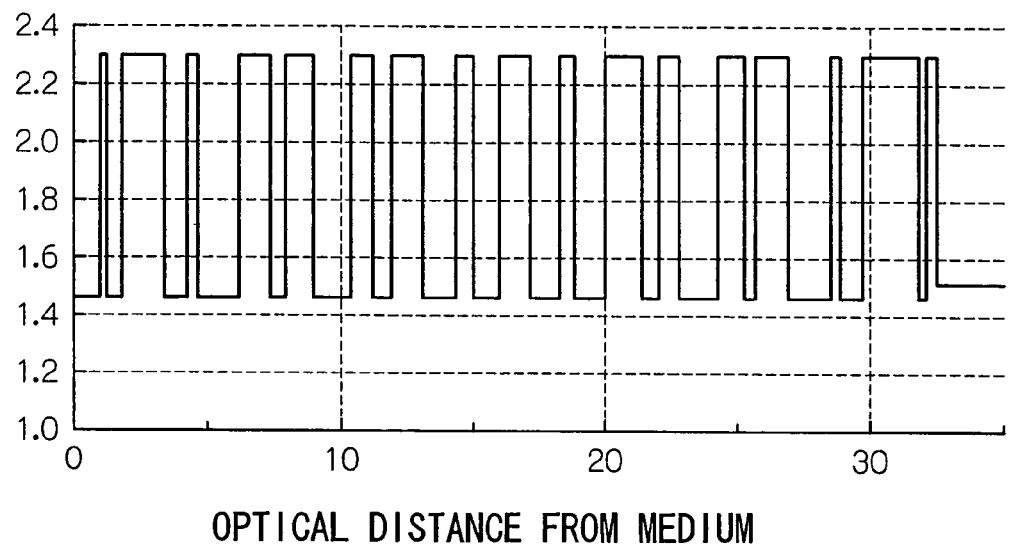
FIGS. 11A and 11B are graphs showing a film structure and spectral characteristics of a conventional absorption filter.
Figure 11B:
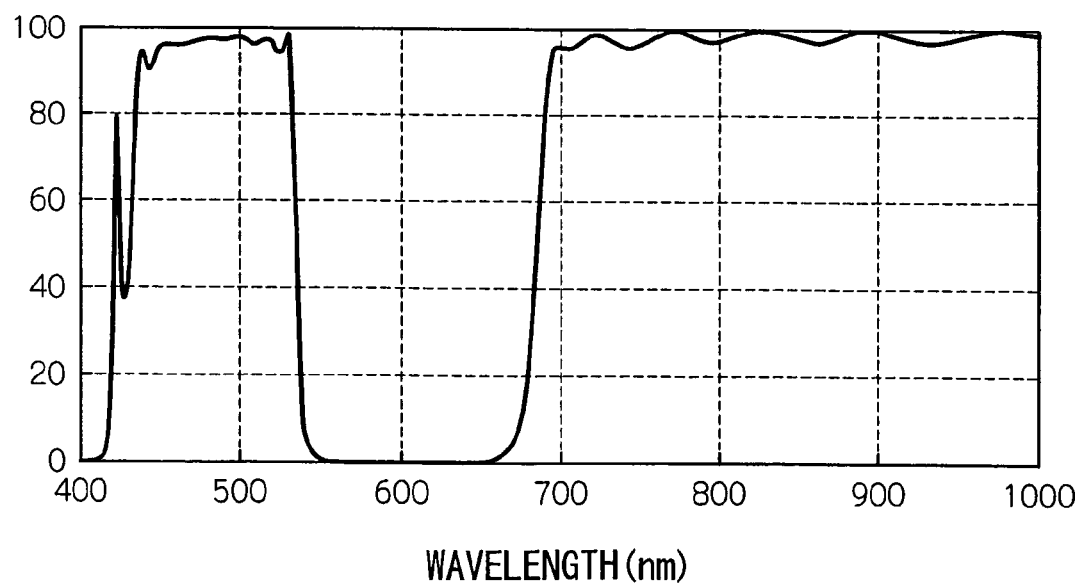
Figure 12A:
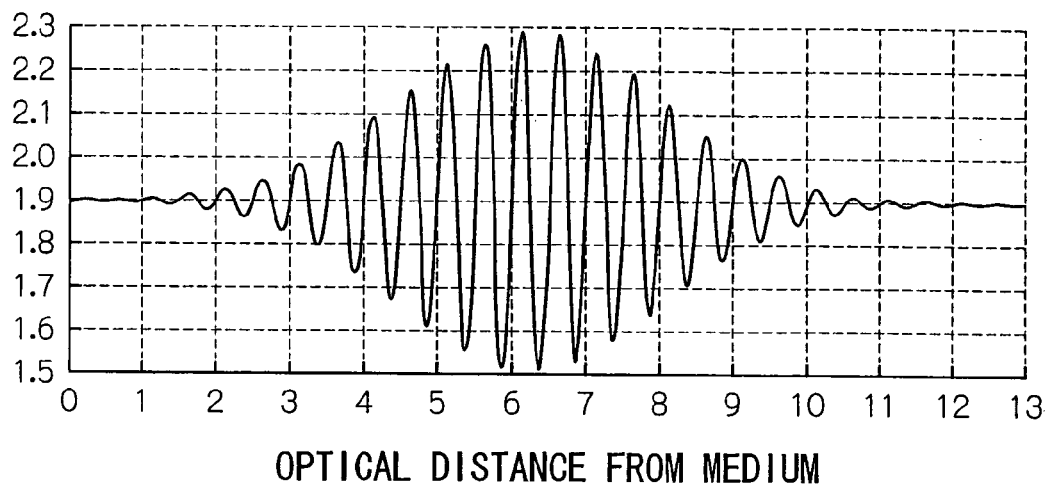
FIGS. 12A and 12B are graphs showing a film structure and spectral characteristics of a conventional absorption filter that is described in the aforementioned Non-Patent Document 1.
Figure 12B:
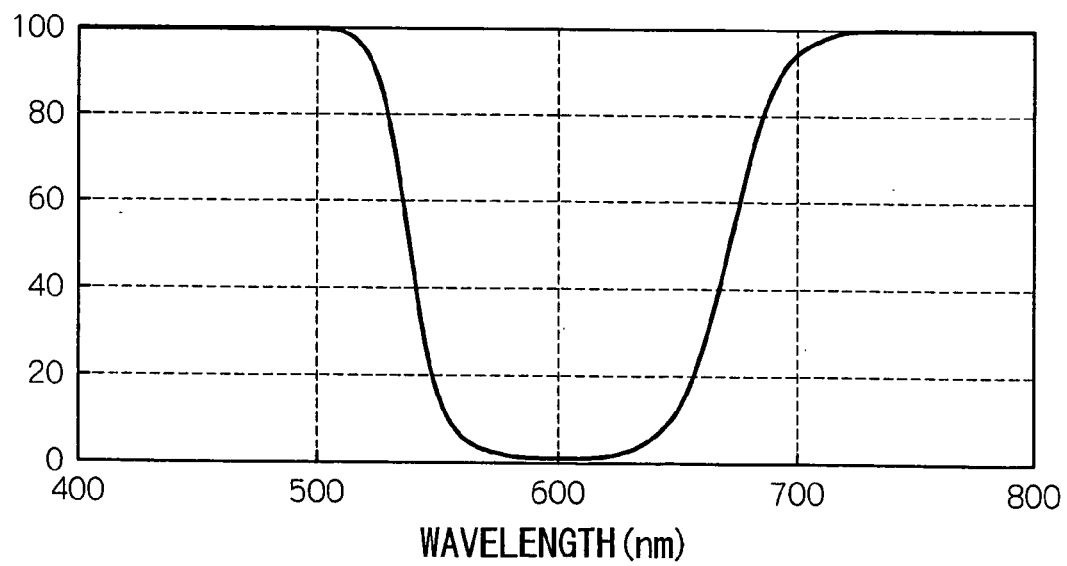
Figure 13A:
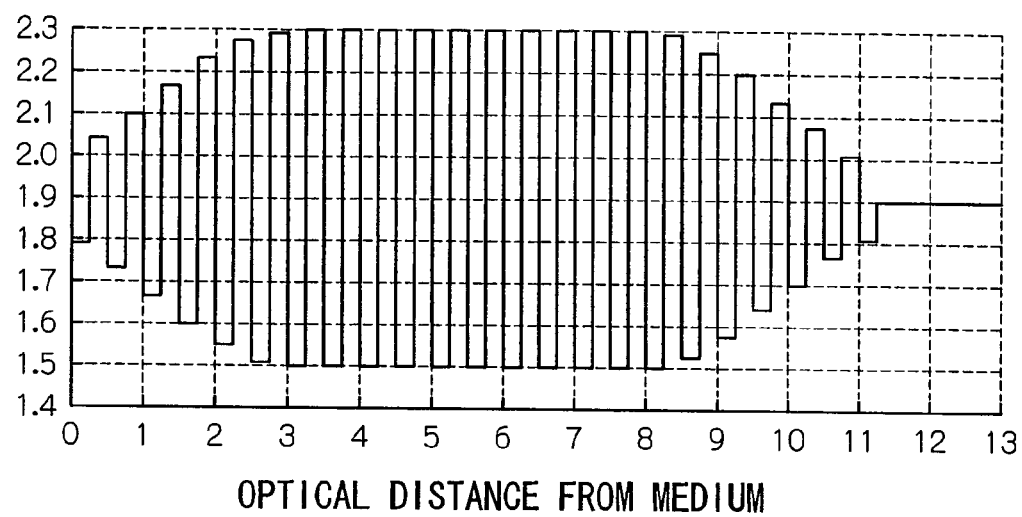
FIGS. 13A and 13B are graphs showing a film structure and spectral characteristics of a conventional absorption filter.
Figure 13B:
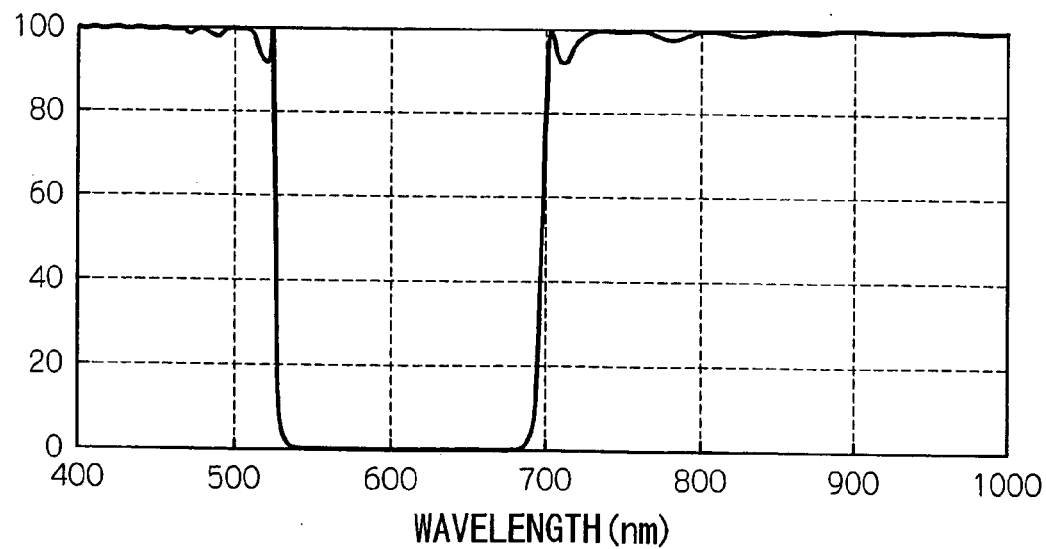

In this case, even if a thin film is formed using a design wavelength of 600/n (wherein n is an integer) run for a central wavelength of 600 nm, and with the optical thicknesses of the high refractive index layers 21 and the low refractive index layers 20 set at n/4 of the design wavelength, it is possible to obtain an absorption filter having exactly the same spectral characteristics as those shown in FIG. 9B.

Figure 14A:
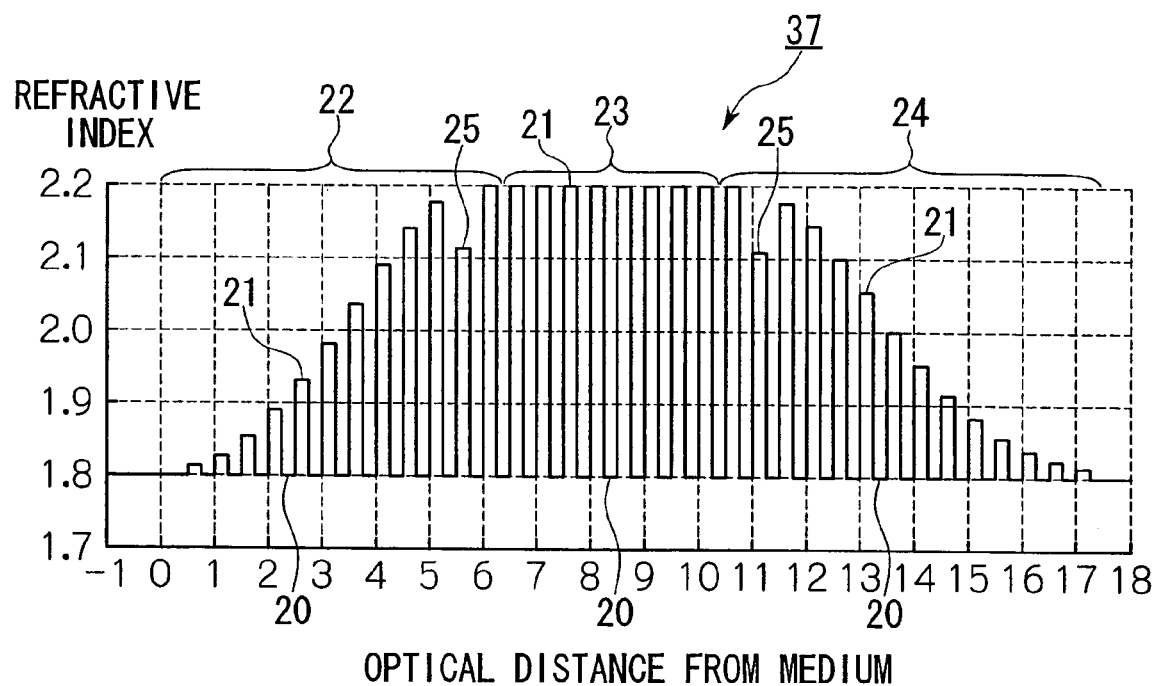
FIGS. 14A and 14B are graphs showing a film structure and spectral characteristics of another embodiment of an absorption filter that is an optical filter of the present invention.

Furthermore, as another embodiment, as is shown in FIG. 14A, it is also possible to employ a thin film 37 in which the refractive index of the substrate 18 forming the thin film 37 is set to 1.8, the refractive indices of the low refractive index layers 20 are set to a uniform value of 1.8 (the same as the refractive index of the substrate 18), the refractive indices of the high refractive index layers 21 in the first laminated portion 22 are gradually changed so as to become higher with the rate of change thereof gradually increasing from 1.82 to 2.2, and the refractive indices of the high refractive index layers 21 in the third laminated portion 24 are gradually changed so as to become lower with the rate of change thereof gradually decreasing from 2.2 to 1.82. At this time, one high refractive index variation layer portion 25, whose refractive index is 2.12, is inserted inside the first laminated portion 22 and at the boundary between the second laminated portion 23 and the first laminated portion 22, and one high refractive index variation layer portion 25, whose refractive index is 2.12, is also inserted inside the third laminated portion 24 and at the boundary between the second laminated portion 23 and the third laminated portion 24.

Note that the optical thickness of the thin film 37 is one quarter the design wavelength, which is 150 nm when λ=600 nm, and the total number of laminated layers is 70.

Figure 14B:
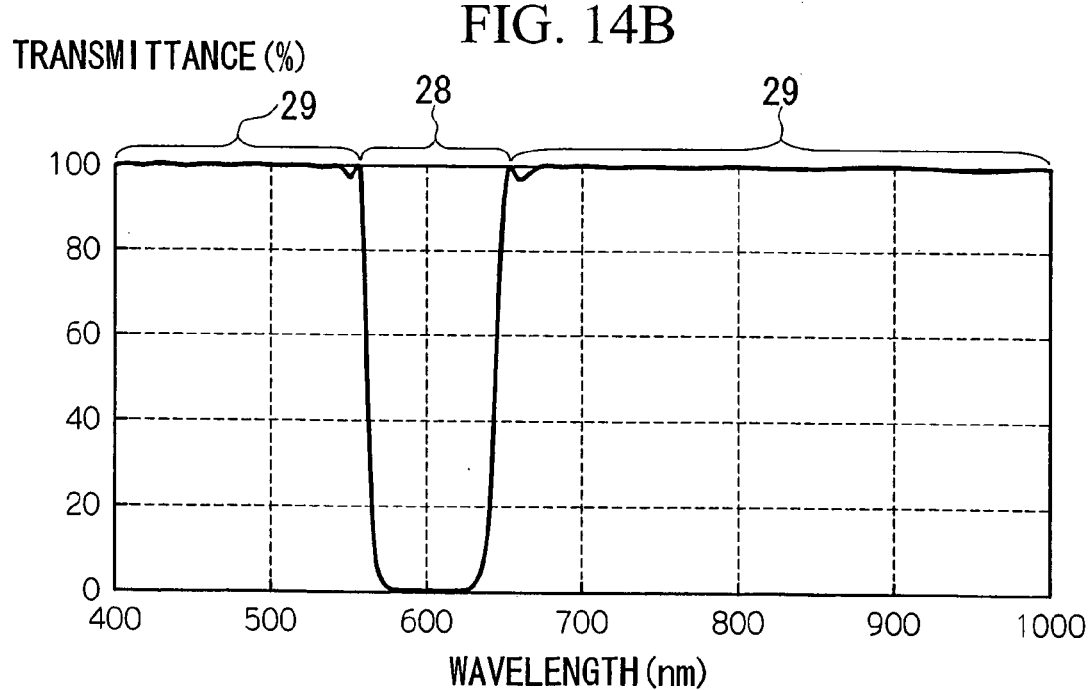

FIG. 14B shows the results of a simulation in which there is no refractive index dispersion in each layer from the initial region 26 to the ultimate region 27.

As is shown in FIG. 14B, using the thin film 37, the same operations and effects can be obtained as those for the above described first embodiment and ripples can be suppressed. Moreover, it is possible to sufficiently prevent the transmission of light in the stopbands while allowing light to pass through even more excellently in the transmission band.

Figure 15A:
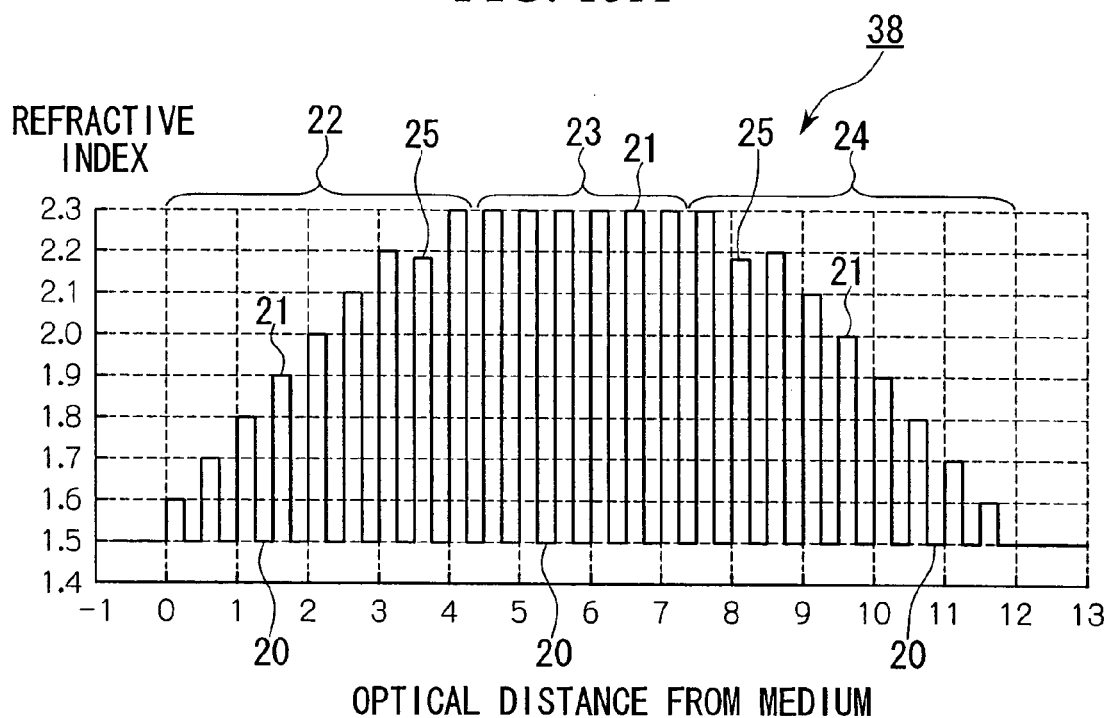
FIGS. 15A and 15B are graphs showing a film structure and spectral characteristics of another embodiment of an absorption filter that is an optical filter of the present invention.

As another example, as is shown in FIG. 15A, it is also possible to employ a thin film 38 in which the refractive index of the substrate 18 forming the thin film 38 is set to 1.5, the refractive indices of the low refractive index layers 20 are set to a uniform value of 1.5 (the same as the refractive index of the substrate 18), the refractive indices of the high refractive index layers 21 in the first laminated portion 22 are changed so as to become higher with the rate of change thereof rectilinearly increasing from 1.6 to 2.3, and the refractive indices of the high refractive index layers 21 in the third laminated portion 24 are changed so as to become lower with the rate of change thereof rectilinearly decreasing from 2.3 to 1.6. At this time, one high refractive index variation layer portion 25, whose refractive index is 2.18, is inserted inside the first laminated portion 22 and at the boundary between the second laminated portion 23 and the first laminated portion 22, and one high refractive index variation layer portion 25, whose refractive index is 2.18, is also inserted inside the third laminated portion 24 and at the boundary between the second laminated portion 23 and the third laminated portion 24.

Note that the optical thickness of the thin film 38 is one quarter the design wavelength, which is 150 nm when λ=600 nm, and the total number of laminated layers is 47.

Figure 15B:
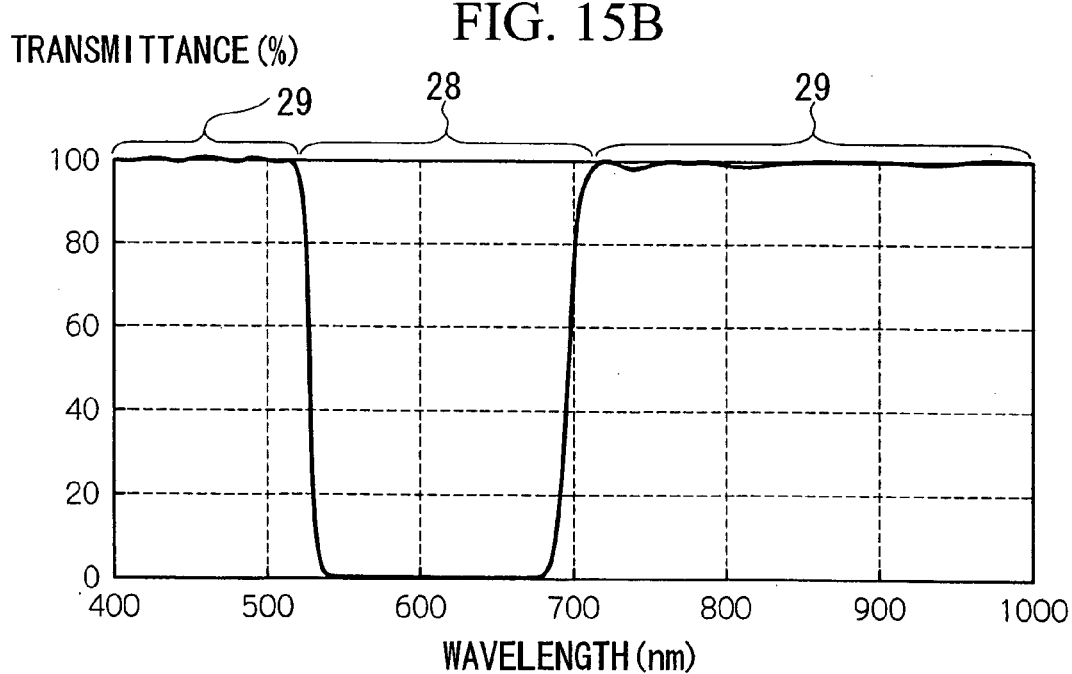

FIG. 15B shows the results of a simulation in which there is no refractive index dispersion in each layer from the initial region 26 to the ultimate region 27.

As is shown in FIG. 15B, using the thin film 38, the same operations and effects can be obtained as those for the above described first embodiment, and ripples can be suppressed.

As has been described above, it is possible to suppress ripples in each of the above cases regardless of the rate of change of the refractive index of the high refractive index layers 21. In addition, loss between the substrate 18 and the thin film 38 is decreased, and light can be transmitted even more excellently in the transmission bands.

Figure 16A:
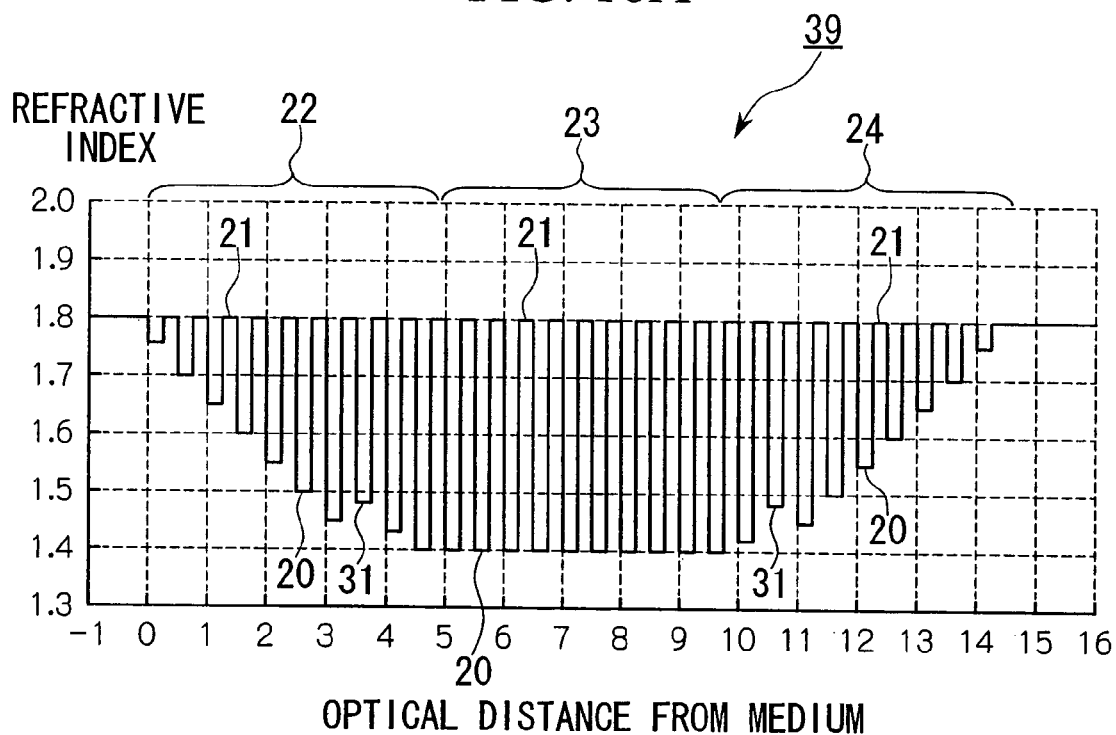
FIGS. 16A and 16B are graphs showing a film structure and spectral characteristics of another embodiment of an absorption filter that is an optical filter of the present invention.

As another example, as is shown in FIG. 16A, it is also possible to employ a thin film 39 in which the refractive index of the substrate 18 forming the thin film 39 is set to 1.8, the refractive indices of the high refractive index layers 21 are set to a uniform value of 1.8 (the same as the refractive index of the substrate 18), the refractive indices of the low refractive index layers 20 in the first laminated portion 22 are changed with the rate of change thereof rectilinearly decreasing from 1.76 to 1.4, and the refractive indices of the low refractive index layers 20 in the third laminated portion 24 are changed with the rate of change thereof rectilinearly increasing from 1.4 to 1.76.

At this time, one low refractive index variation layer portion 31, whose refractive index is 1.48, is inserted inside the first laminated portion 22 and at the boundary between the second laminated portion 23 and the first laminated portion 22, and one low refractive index variation layer portion 31, whose refractive index is 1.48, is also inserted inside the third laminated portion 24 and at the boundary between the second laminated portion 23 and the third laminated portion 24.

Note that the optical thickness of the thin film 39 is one quarter the design wavelength, which is 150 nm when λ=600 nm, and the total number of laminated layers is 57.

Figure 16B:
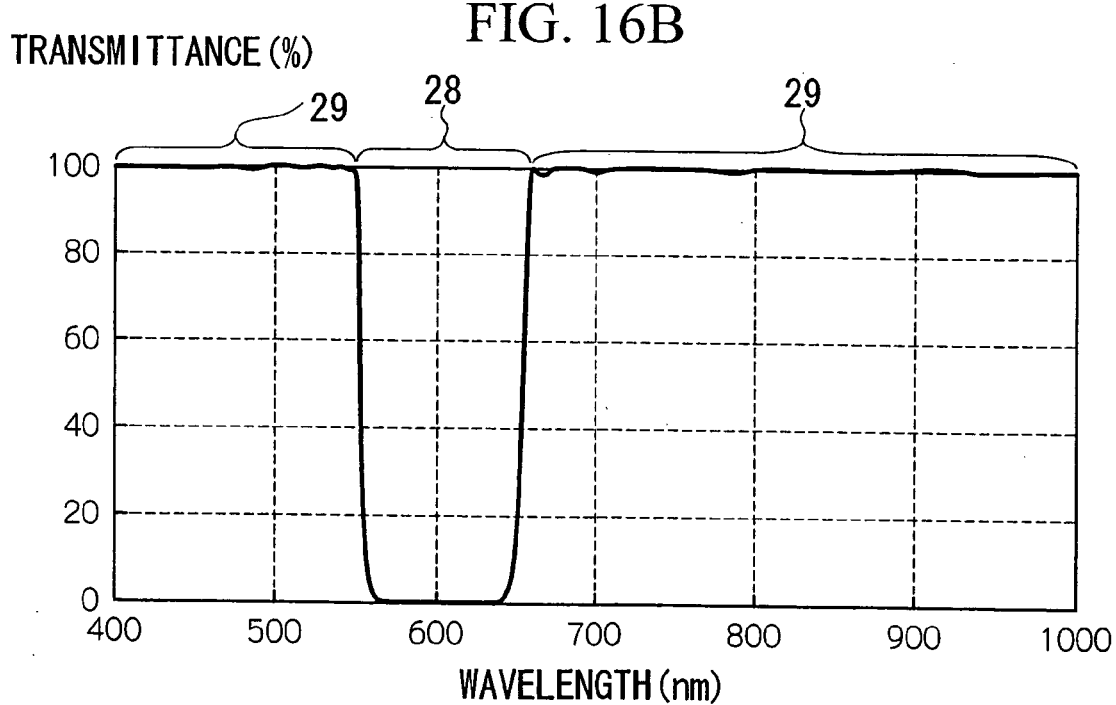

FIG. 16B shows the results of a simulation in which there is no refractive index dispersion in each layer from the initial region 26 to the ultimate region 27.

As is shown in FIG. 16B, using the thin film 39, the same operations and effects can be obtained as those for the above described first embodiment and ripples can be suppressed. In addition, loss between the substrate 18 and the thin film 39 is decreased, and light can be transmitted even more excellently in the transmission bands.

Note that the central wavelength (λ) is not limited to 600 nm, and by changing the value of λ appropriately in accordance with the wavelength of the excitation light and the wavelength of the fluorescent light being detected, the desired spectral characteristics can be obtained.

Moreover, the material of the substrate is not limited to glass, and plastic may also be employed. It is also possible to provide a plurality of layers for each of the low refractive index variation layer portions 31, while it is sufficient if at least one layer of the high refractive index variation layer portions 25 and low refractive index variation layer portions 31 are inserted.

However, the insertion positions of the high refractive index variation layer portions 25 are preferably at the boundary between the second laminated portion 23 and the first laminated portion 22 or at the boundary between the second laminated portion 23 and the third laminated portion 24, or else in the vicinities thereof (for example, within four layers from the boundaries), as this enables a more excellent effect to be obtained.

The same operation and effects can be obtained regardless of whether the rate of change of the refractive indices of the low refractive index layers 20 of the first laminated portion 22 and the high refractive index layers 21 of the first laminated portion 22 is rectilinear or curved, and regardless of whether the rate of change of the refractive indices of the low refractive index layers 20 of the third laminated portion 24 and the high refractive index layers 21 of the third laminated portion 24 is rectilinear or curved.

As has been described above, the present invention provides the following effects.

According to the optical filter of the present invention, when transmitting light, in filter characteristics that cut out light that corresponds to a stopband of a predetermined wavelength area while transmitting light of a transmission band that corresponds to the remaining wavelengths, it is possible to make the boundaries between the transmission bands and the stopband sharper and thereby increase the amount of transmitted light. In addition, it is possible to suppress ripples in the transmission band. Namely, because there are provided the first laminated portion through the third laminated portion, and there is also provided the refractive index variation layer portion that is inserted in at least one from among the first laminated portion through the third laminated portion, it is possible to make the rise in the spectral characteristics at boundaries between the stopbands and transmission bands extremely abrupt. It is also possible to almost completely suppress ripples in the transmission bands, and it is possible to obtain high performance filter characteristics in which the film structure simplifies control of the film thickness during film formation, and in which the boundaries between transmission bands and stopbands are made more defined.

In addition, when the refractive index of the low refractive index layers is made the same as the refractive index of the substrate, it is possible to sufficiently cut out light in the stopbands, while further increasing the amount of light transmitted in the transmission bands.

In addition, when the optical thicknesses of the low refractive index layers, the high refractive index layers, and the high refractive index variation layer portions are set at substantially n/4 of the design wavelength, controllability of the film thickness when a film is actually being manufactured is improved and consistent spectral characteristics can be obtained.

In addition, when the optical thickness of at least one layer from among the initial region that is adjacent to the substrate and the ultimate region that is on the opposite side from the initial region is set at substantially n/2 of the design wavelength, ripples in the transmission bands can be suppressed even further and the spectral characteristics can be improved.

The optical instrument of the present invention includes an optical filter that has sharp boundaries between transmission bands and stopbands even when the transmitting wavelengths and the transmission cutting wavelengths are close together. As a result, it is possible to efficiently transmit light without reducing the amount of light in the wavelengths of the transmission bands, and to manifest filter characteristics that have excellent spectral characteristics. Namely, by providing an optical instrument with the optical filter of the present invention, it is possible to cut out unnecessary light during an observation and to efficiently select light of the desired wavelength. It is accordingly possible to further improve the detection sensitivity of light such as fluorescent light compared with a conventional apparatus.

The present invention relates to an optical filter and an optical instrument. According to the optical filter of the present invention, because there are provided the first laminated portion through the third laminated portion, and there is also provided the refractive index variation layer portion that is inserted in at least one from among the first laminated portion through the third laminated portion, it is possible to make the rise in the spectral characteristics at boundaries between the stopbands and transmission bands extremely abrupt. It is also possible to almost completely suppress ripples in the transmission bands, and it is possible to obtain high performance filter characteristics in which the film structure simplifies control of the thickness during film formation, and in which the boundaries between transmission bands and stopbands are made more defined.

In addition, according to the optical instrument of the present invention, because this optical instrument includes the optical filter of the present invention, it is possible to cut out unnecessary light during an observation and to efficiently select light of the desired wavelength. It is accordingly possible to further improve the detection sensitivity of light such as fluorescent light compared with a conventional apparatus.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. An optical filter comprising a substrate and a thin film that is formed on the substrate,
   wherein the thin film comprises low refractive index layers and high refractive index layers that have a higher refractive index than the low refractive index layers, the low refractive index layers and the high refractive index layers being alternately laminated from the substrate side,
   wherein in this thin film are further formed: a first laminated portion in which the refractive indices of the high refractive index layers gradually increase from the substrate side; a second laminated portion that is adjacent to the first laminated portion, and in which the refractive indices of the high refractive index layers are substantially the same as the highest refractive index from among the high refractive index layers constituting the first laminated portion; and a third laminated portion that is adjacent to the second laminated portion, and in which the refractive indices of the high refractive index layers gradually decrease from the second laminated portion side,
   wherein a high refractive index variation layer portion, in which the refractive index of the high refractive index layer is set so as to be lower than the other two high refractive index layers that are adjacent on both sides thereof via the low refractive index layers, is inserted into at least one of the first laminated portion through the third laminated portion.

2. The optical filter according to claim 1, wherein the high refractive index variation layer portion is inserted at a boundary or in a vicinity of a boundary between the second laminated portion and the first laminated portion or between the second laminated portion and the third laminated portion.

3. The optical filter according to claim 1, wherein a refractive index of the low refractive index layers is substantially the same as a refractive index of the substrate.

4. The optical filter according to claim 1, wherein if a design wavelength for a central wavelength ($\lambda$) of a wavelength band in which transmission is blocked is taken as $\lambda/n$ (wherein n is an integer), then optical thicknesses of the high refractive index layers, the low refractive index layers, and the high refractive index variation layer portion are set to substantially n/4 of the design wavelength.

5. The optical filter according to claim 4, wherein an optical thickness of at least one of a layer forming an initial region that is adjacent to the substrate and an ultimate region that is on an opposite side from the substrate from the thin film is set to substantially n/2 of the design wavelength.

6. An optical filter comprising a substrate and a thin film that is formed on the substrate,
   wherein the thin film comprises low refractive index layers and high refractive index layers that have a higher refractive index than the low refractive index layers, the low refractive index layers and the high refractive index layers being alternately laminated from the substrate side, and
   wherein in this thin film are further formed: a first laminated portion in which the refractive indices of the high refractive index layers gradually increase from the substrate side; a second laminated portion that is adjacent to the first laminated portion, and in which the refractive indices of the high refractive index layers are substantially the same as the highest refractive index from among the high refractive index layers constituting the first laminated portion; and a third laminated portion that is adjacent to the second laminated portion, and in which the refractive indices of the high refractive index layers gradually decrease from the second laminated portion side, and
   wherein a low refractive index variation layer portion, in which the refractive index of the low refractive index layer is set so as to be higher than the other two low refractive index layers that are adjacent on both sides thereof via the high refractive index layers, is inserted into at least one of the first laminated portion through the third laminated portion.

7. The optical filter according to claim 6, wherein a refractive index of the high refractive index layers is substantially the same as a refractive index of the substrate.

8. An optical filter comprising a substrate and a thin film that is formed on the substrate,
   wherein the thin film comprises low refractive index layers and high refractive index layers that have a higher refractive index than the low refractive index layers, the low refractive index layers and the high refractive index layers being alternately laminated from the substrate side,
   wherein in this thin film are further formed: a first laminated portion in which the refractive indices of the high refractive index layers gradually increase from the substrate side, and the refractive indices of the low refractive index layers gradually decrease from the substrate side; a second laminated portion that is adjacent to the first laminated portion, and in which the refractive indices of the high refractive index layers are substantially the same as the highest refractive index from among the high refractive index layers constituting the first laminated portion, and the refractive indices of the low refractive index layers are substantially the same as the lowest refractive index from among the low refractive index layers constituting the first laminated portion; and a third laminated portion that is adjacent to the second laminated portion, and in which the refractive indices of the high refractive index layers gradually decrease from the second laminated portion side, and the refractive indices of the low refractive index layers gradually increase from the second laminated portion side, and wherein at least one of a high refractive index variation layer portion, in which the refractive index of the high refractive index layer is set so as to be lower than the other two high refractive index layers that are adjacent on both sides thereof via the low refractive index layers and the low refractive index variation layer portion, in which the refractive index of the low refractive index layer is set so as to be higher than the other two low refractive index layers that are adjacent on both sides thereof via the high refractive index layers, is inserted into at least one of the first laminated portion through the third laminated portion.

9. The optical filter according to claim 6, wherein at least one of the high refractive index variation layer portion and the low refractive index variation layer portion is inserted at a boundary or in a vicinity of a boundary between the second laminated portion and the first laminated portion or between the second laminated portion and the third laminated portion.

10. The optical filter according to claim 6, wherein if a design wavelength for a central wavelength ($\lambda$) of a wavelength band in which transmission is blocked is taken as $\lambda/n$ (wherein n is an integer), then optical thicknesses of the high refractive index layers, the low refractive index layers, the high refractive index variation layer portion, and the low refractive index variation layer portion are set to substantially n/4 of the design wavelength.

11. The optical filter according to claim 10, wherein an optical thickness of at least one of a layer forming an initial region that is adjacent to the substrate and an ultimate region that is on an opposite side from the substrate from the thin film is set to substantially n/2 of the design wavelength.

12. An optical instrument provided with the optical filter according to claim 1.

* * * * *